(12) United States Patent
Nunome et al.

(10) Patent No.: US 12,512,941 B2
(45) Date of Patent: Dec. 30, 2025

(54) BASE STATION, TERMINAL, AND COMMUNICATION METHOD

(71) Applicant: Panasonic Intellectual Property Corporation of America, Torrance, CA (US)

(72) Inventors: Tomoya Nunome, Ishikawa (JP); Hidetoshi Suzuki, Kanagawa (JP); Takashi Iwai, Ishikawa (JP); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 276 days.

(21) Appl. No.: 18/040,417

(22) PCT Filed: Jun. 17, 2021

(86) PCT No.: PCT/JP2021/023069
§ 371 (c)(1),
(2) Date: Feb. 2, 2023

(87) PCT Pub. No.: WO2022/030113
PCT Pub. Date: Feb. 10, 2022

(65) Prior Publication Data
US 2023/0283431 A1    Sep. 7, 2023

(30) Foreign Application Priority Data
Aug. 7, 2020 (JP) .................. 2020-134799

(51) Int. Cl.
*H04L 5/00*     (2006.01)

(52) U.S. Cl.
CPC .......... *H04L 5/0051* (2013.01); *H04L 5/0096* (2013.01)

(58) Field of Classification Search
CPC ........................... H04L 5/0051; H04L 5/0096
See application file for complete search history.

(56) References Cited

U.S. PATENT DOCUMENTS

| 2017/0079026 | A1  | 3/2017 | Li et al. |
| 2020/0059337 | A1* | 2/2020 | Yamada .............. H04L 27/2613 |
| 2020/0195532 | A1  | 6/2020 | Crabtree et al. |

(Continued)

FOREIGN PATENT DOCUMENTS

| JP | 2017520148 A  | 7/2017 |
| JP | 2020109886 A  | 7/2020 |
| WO | 2020137072 A1 | 7/2020 |

OTHER PUBLICATIONS

3GPP, "3rd Generation Partnership Project; Technical Specification Group Radio Access Network; NR; Multiplexing and channel coding (Release 16)," 3GPP TS 38.212 V16.2.0, Jun. 2020. (151 pages).

(Continued)

*Primary Examiner* — Derrick V Rose
(74) *Attorney, Agent, or Firm* — Seed Intellectual Property Law Group LLP

(57) ABSTRACT

The present invention improves transmission efficiency in unlicensed bands. This base station comprises: a control circuit for determining a cyclic prefix (CP) length coordinated between a terminal and the base station; and a transmission circuit for transmitting control information regarding the determined CP length to the terminal.

15 Claims, 18 Drawing Sheets

(56) References Cited

U.S. PATENT DOCUMENTS

| | | | |
|---|---|---|---|
| 2020/0245353 A1 | 7/2020 | Tsai et al. | |
| 2021/0195532 A1 | 6/2021 | Ouchi et al. | |
| 2021/0227591 A1 | 7/2021 | Iwai et al. | |
| 2021/0368542 A1* | 11/2021 | Xue | H04W 72/23 |
| 2022/0078841 A1* | 3/2022 | Tiirola | H04W 72/02 |
| 2023/0171807 A1* | 6/2023 | Xu | H04L 5/0037 |
| | | | 370/329 |
| 2023/0284265 A1* | 9/2023 | Rosa | H04W 74/0808 |
| | | | 370/336 |

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical channels and modulation (Release 16)," 3GPP TS 38.211 V16.2.0, Jun. 2020. (131 pages).

3GPP, "3rd Generation Partnership Project; Technical Specification Group Radio Access Network; NR; Physical layer procedures for control (Release 16)," 3GPP TS 38.213 V16.2.0, Jun. 2020. (176 pages).

3GPP, "3rd Generation Partnership Project; Technical Specification Group Radio Access Network; NR; Physical layer procedures for data (Release 16)," 3GPP TS 38.214 V16.2.0, Jun. 2020. (163 pages).

3GPP, "3rd Generation Partnership Project; Technical Specification Group Radio Access Network; NR; Radio Resource Control (RRC) protocol specification (Release 16)," 3GPP TS 38.331 V16.1.0, Jul. 2020. (906 pages).

3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

ETSI, "5 GHz RLAN; Harmonized Standard covering the essential requirements of article 3.2 of Directive 2014/53/EU," ETSI EN 301 893 V2.1.1, May 2017, 122 pages.

International Search Report, mailed Aug. 24, 2021, for International Patent Application No. PCT/JP2021/023069. (6 pages)(with Translation).

International Telecommunication Union, "IMT Vision—Framework and overall objectives of the future development of IMT for 2020 and beyond; M Series; Mobile, radiodetermination, amateur and related satellite services," Recommendation ITU-R M.2083-0, Sep. 2015. (21 pages).

Panasonic, "Enhancements for unlicensed band URLLC/IIoT," R1-2006344, Agenda Item: 8.3.2, 3GPP TSG RAN WG1 #102-e, e-Meeting, Aug. 17-28, 2020. (4 pages).

\* cited by examiner

| CP extension |
|---|
| 0 (i.e. no CP extension) |
| C1*symbol length – 25 us |
| C2*symbol length – 16 us – TA |
| C3*symbol length – 25 us – TA |

FIG. 3

Table for within gNB COT (e.g., Table 1)

| Index | CP extension | Channel Access Type | CAPC |
|---|---|---|---|
| 0 | 0 | Cat. 4 | 4 |
| 1 | C1*symbol length – 25 us | Cat. 2 25 us | 3 |
| 2 | C2*symbol length – 16 us – TA | Cat.1 16 us | 1 |
| ... | ... | ... | ... |

Table for outside of gNB COT (e.g., Table 2)

| Index | CP extension | CAPC |
|---|---|---|
| 0 | T – 16 us | 4 |
| 1 | T – 25 us | 3 |
| 2 | T – 34 us | 2 |
| ... | ... | ... |

FIG. 10

| Index | Index of CP extension | Channel Access Type | CAPC |
|---|---|---|---|
| 0 | Index 0 of Table 1 | Cat. 4 | 4 |
| 1 | Index 1 of Table 1 | Cat. 2 25 us | 3 |
| 2 | Index 2 of Table 1 | Cat.1 16 us | 1 |
| 3 | Index 0 of Table 2 | – | 4 |
| 4 | Index 1 of Table 2 | – | 3 |
| 5 | Index 2 of Table 2 | – | 2 |
| ... | ... | ... | ... |

FIG. 11

| Index | CP extension | CAPC | Next FFP |
|---|---|---|---|
| 0 | T − 16 us | 4 | 0 |
| 1 | T − 25 us | 3 | 1 |
| 2 | T − 34 us | 2 | 1 |
| ... | ... | ... | ... |

FIG. 12

| Index | CP extension | CAPC | Re-attempt |
|---|---|---|---|
| 0 | T – 16 us | 4 | 0 |
| 1 | T – 25 us | 3 | 1 |
| 2 | T – 34 us | 2 | 1 |
| ... | ... | ... | ... |

FIG. 13

Table for low priority

| Index | CP extension | Channel Access Type | CAPC |
|---|---|---|---|
| 0 | T – 43 us | Cat. 4 | 4 |
| 1 | T – 52 us | Cat. 4 | 3 |
| 2 | T – 61 us | Cat. 4 | 2 |
| ... | ... | ... | ... |

Table for high priority

| Index | CP extension | Channel Access Type | CAPC |
|---|---|---|---|
| 0 | T – 16 us | Cat. 4 | 4 |
| 1 | T – 25 us | Cat. 4 | 3 |
| 2 | T – 34 us | Cat. 4 | 2 |
| ... | ... | ... | ... |

FIG. 14

BASE STATION, TERMINAL, AND COMMUNICATION METHOD

TECHNICAL FIELD

The present disclosure relates to a base station, a terminal, and a communication method.

BACKGROUND ART

The specification of a physical layer for Release 16 new radio access technology (NR) has been completed as functional extension of the 5th generation mobile communication systems (5G) in the 3rd generation partnership project (3GPP). NR supports functions for realizing ultra reliable and low latency communication (URLLC) in addition to enhanced mobile broadband (eMBB) to meet a requirement such as high speed and large capacity (see, for example, Non Patent Literatures 1 to 5).

CITATION LIST

Non Patent Literature

NPL 1
3GPP TS 38.211 V16.2.0, "NR; Physical channels and modulation (Release 16)", June 2020
NPL 2
3GPP TS 38.212 V16.2.0, "NR; Multiplexing and channel coding (Release 16)", June 2020
NPL 3
3GPP TS 38.213 V16.2.0, "NR; Physical layer procedure for control (Release 16)", June
NPL 4
3GPP TS 38.214 V16.2.0, "NR; Physical layer procedures for data (Release 16)", June 2020
NPL 5
3GPP TS 38.331 V16.1.0, "NR; Radio Resource Control (RRC) protocol specification (Release 16)", July 2020

SUMMARY OF INVENTION

However, there is room for further study on a communication method in an unlicensed band.

One non-limiting and exemplary embodiment facilitates providing a base station, a terminal, and a communication method each capable of improving transmission efficiency in an unlicensed band.

A base station according to an exemplary embodiment of the present disclosure includes: control circuitry, which, in operation, determines a cyclic prefix (CP) length coordinated between a terminal and the base station; and transmission circuitry, which, in operation, transmits control information on the CP length to the terminal, where the CP length has been determined.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve transmission efficiency in an unlicensed band.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 3 illustrates exemplary amounts of CP extension for gap adjustment;
FIG. 10 illustrates an exemplary configuration of amounts of CP extension according to Embodiment 2;
FIG. 11 illustrates an exemplary configuration of amounts of CP extension according to Embodiment 2;
FIG. 12 illustrates an exemplary configuration of amounts of CP extension according to Embodiment 3;
FIG. 13 illustrates an exemplary configuration of amounts of CP extension according to Embodiment 3;
FIG. 14 illustrates an exemplary configuration of amounts of CP extension according to Embodiment 4.

DESCRIPTION OF EMBODIMENTS

Hereinafter, embodiments of the present disclosure will be described in detail with reference to the accompanying drawings.

[Unlicensed Frequency Band]

In Release 16 NR, for example, NR-Unlicensed (or also referred to as NR-U) is considered to be introduced, in which communication based on an NR radio access scheme is performed in an unlicensed frequency band (or also referred to as an unlicensed band).

In an unlicensed frequency band, for example, each apparatus performs carrier sensing (also referred to as, for example, listen before talk (LBT)) before transmission in order to confirm whether another system or terminal or the like is using the radio channel.

Further, enhancement is considered to be implemented in Release 17 NR in order to operate, for example, an ultra reliable and low latency communications (URLLC) service in an unlicensed frequency band. As one content to be enhanced, for example, it is considered how to address an operation for a terminal (also referred to as, for example, user equipment (UE)) to acquire a channel occupancy time (e.g., COT: channel occupancy time) in frame based equipment (FBE) that is one channel access scheme. Note that, the FBE is also referred to as, for example, semi-static channel occupancy.

However, a scheduling method in the UE-initiated COT has not been sufficiently considered.

Figure 1:
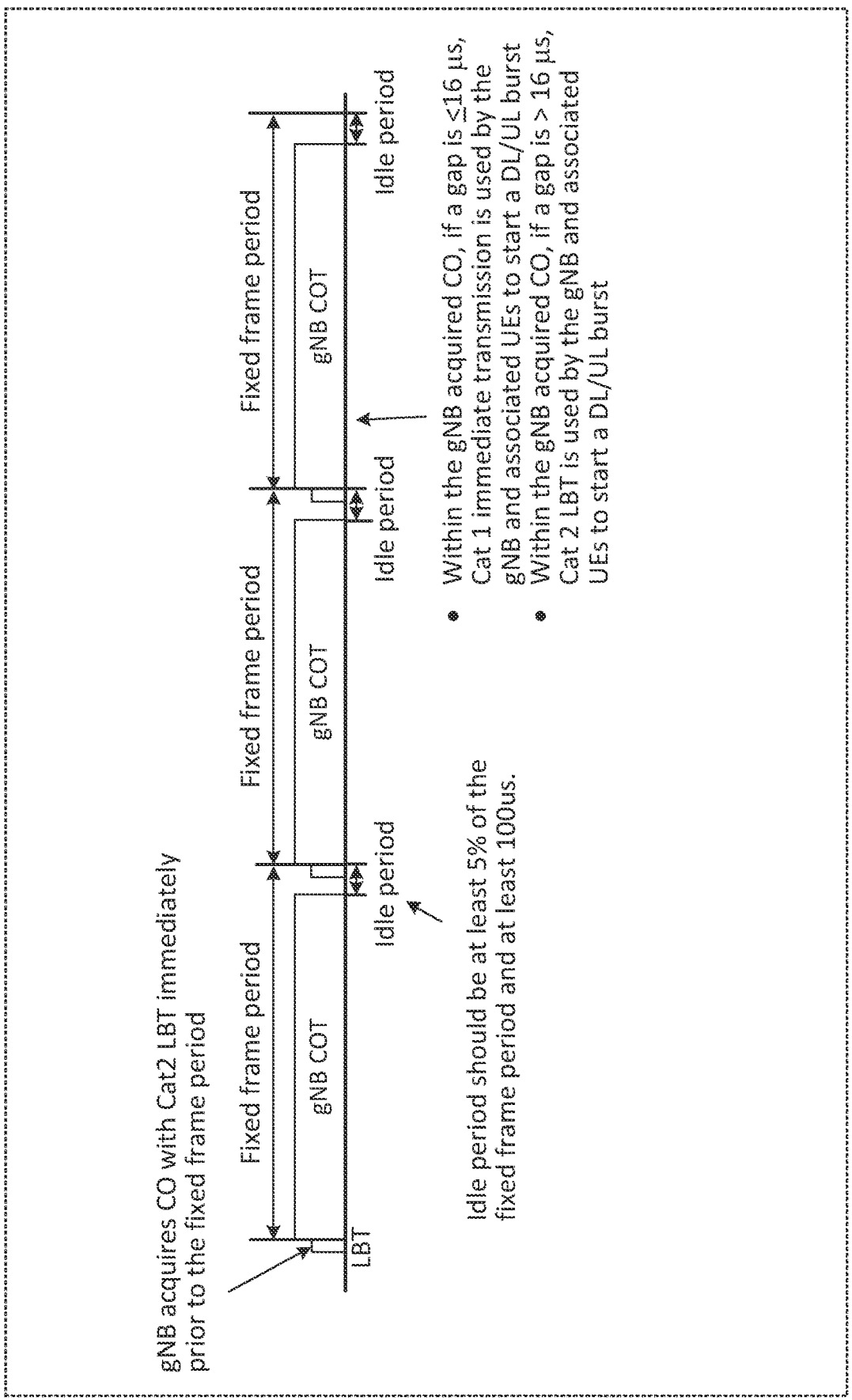
FIG. 1 illustrates an exemplary channel access by frame based equipment (FBE)

FIG. 1 illustrates an exemplary channel access by the FBE. In the FBE of Release 16 NR-U, a base station (also referred to as, for example, gNB) may acquire a COT by, for example, performing the LBT (e.g., category 2 LBT) at the beginning of a period, which is also referred to as a fixed frame period (FFP), as illustrated in FIG. 1. A terminal may acquire a COT by, for example, performing category 2 LBT or category 1 LBT within a COT of a base station (also referred to as, for example, gNB COT).

In load based equipment (LBE) that is another channel access scheme different from the FBE, it is possible to attempt COT acquisition at an arbitrary timing, for example. In the LBE, on the other hand, category 4 LBT in which a longer LBT duration in comparison with category 1 or category 2 may be configured may be performed, for example.

As described above, the FBE makes it possible to acquire a COT in a shorter LBT duration in comparison with the LBE, for example. In the FBE, on the other hand, an "idle period" that is a duration in which neither a base station nor a terminal are allowed to perform transmission (e.g., a duration in which no COT can be acquired) is provided as illustrated in FIG. 1, for example.

[Configured Grant Transmission]

Configured grant transmission (e.g., configured grant transmission in a licensed frequency band) supported in Release 15 NR will be described.

The configured grant transmission for uplink data (e.g., physical uplink shared channel (PUSCH)) includes, for example, "configured grant type 1 transmission" and "configured grant type 2 transmission".

In the configured grant type 1 transmission, for example, information (referred to as, for example, configured grant configuration information or CG configuration information) such as a modulation and coding scheme (MCS), radio resource allocation (e.g., allocation of at least one of time resources and frequency resources), a transmission timing, and the number of hybrid automatic repeat request (HARQ) processes may be configured (in other words, indicated or instructed) to a terminal by a UE-specific higher layer signaling. In a case where uplink data is generated, for example, the terminal may transmit the uplink data (e.g., PUSCH) based on preconfigured CG configuration information, such as an MCS and a radio resource, without a UL grant (e.g., dynamic scheduling information for uplink data) via a downlink control channel (e.g., physical downlink control channel (PDCCH)) from the base station.

Note that, the higher layer signaling is sometimes referred to as, for example, a radio resource control (RRC) signal, higher layer signaling, or a higher layer parameter.

In the configured grant type 2 transmission, for example, the configured grant transmission is activated or released by a PDCCH from the base station. In the configured grant type 2 transmission, for example, information such as the transmission timing and the number of HARQ processes may be configured by a UE-specific higher layer signaling as in the configured grant type 1 transmission. Information such as the MCS and radio resource allocation information, on the other hand, may be configured by downlink control information (DCI) for activation in the configured grant type 2 transmission. In a case where uplink data is generated, for example, the terminal may transmit the uplink data (e.g., PUSCH) by semi-permanently (in other words, statically or semi-statically) using the CG configuration information such as the MCS and radio resource configured by the higher layer signaling and the DCI for activation (in other words, without a UL grant or UL grant free).

In Release 15 NR, for example, a UL grant is used for retransmission control of the configured grant transmission. For example, an MCS and radio resource allocation information of uplink data for retransmission may be controlled by the UL grant.

Additionally, a HARQ process number (or HARQ process ID) used in the configured grant transmission may be uniquely determined from a slot number for transmitting a PUSCH (in other words, transmission timing of the PUSCH), by way of non-limiting example. The PUSCH transmitted in the configured grant transmission may be handled similar to a signal that is initially transmitted, for example, and the redundancy version (RV) may be zero.

[Configured Grant Transmission in Unlicensed Frequency Band]

In the configured grant transmission in NR-U (NR in an unlicensed frequency band), for example, some of parameters (e.g., parameters on retransmission control) used for decoding a PUSCH, such as a HARQ process number, new data indicator (NDI), and RV, may be indicated to the base station by the terminal by uplink control information for the configured grant transmission (referred to as, for example, configured grant uplink control information (CG-UCI)).

The CG-UCI may be transmitted at the same transmission timing (e.g., the same slot) as the PUSCH (or sometimes referred to as CG-PUSCH), for example, by using a part of a radio resource allocated to the PUSCH. In other words, the CG-UCI may be multiplexed with the CG-PUSCH.

The reason why the HARQ process number is explicitly indicated by using the CG-UCI in NR-U is as follows. For example, in NR-U, the PUSCH is not always transmitted, depending on the result of the LBT. For example, in a method of determining the HARQ process number linking with a transmission timing of a PUSCH as in a licensed frequency band, the HARQ process may not be flexibly used depending on whether the PUSCH is actually transmitted. Thus, the HARQ process number is possibly indicated using, for example, the CG-UCI transmitted with the CG-PUSCH.

In addition, NR-U supports an operation of retransmission by a terminal using a radio resource configured for the configured grant without a UL grant, for example, upon reception of NACK or timer expiration. In this regard, information indicating the state of initial transmission or retransmission (e.g., NDI) and the RV applied to the PUSCH at the time of retransmission, for example, may be transmitted by the CG-UCI.

In NR-U, for example, HARQ-ACK feedback to the CG-PUSCH may be explicitly indicated from a base station to a terminal by using information called a downlink feedback indicator (DFI). For example, the HARQ process number for the CG-PUSCH is indicated by the CG-UCI. Thus, when the bae station fails to receive the CG-UCI, for example, it may be impossible to specify on a side of the base station which HARQ process data has been transmitted, and it may be impossible to designate the HARQ process and instruct retransmission of the PUSCH. With this regard, the base station may indicate (in other words, feed back) HARQ-ACK feedback information for all HARQ processes, for example. Further, the base station can reduce the overhead caused by the LBT and improve the efficiency of retransmission control by, for example, collectively feeding back HARQ-ACK feedback information for a plurality of PUSCHs to the terminal.

Note that, in retransmission control by the DFI, the MCS and radio resource allocation for the retransmission PUSCH may be the same as in the initial transmission. The DFI may be transmitted through the PDCCH, for example. Further, the DFI may include, for example, another parameter such as a transmission power control (TPC) command in addition to the HARQ-ACK.

[CP Extension in CG-PUSCH]

In CG-PUSCH transmission, PUSCH transmission is not performed in a case where the terminal includes no transmission data even when a transmission resource is allocated to the terminal, for example. In a case where PUSCH transmission is not performed, the resource allocated to the terminal is not used, and thus the resource utilization efficiency may decrease.

Given the above, for example, a method of assigning a plurality of terminals to the same CG resource to share the resource has been considered. In the resource sharing by a plurality of terminals, for example, when the plurality of terminals performs transmission on the shared resource at the same time, a collision may occur and the base station may not correctly receive signals of the respective terminals. Given the above, for example, a mechanism for configuring different transmission start timings for each terminal by using "CP extension" has been introduced as a mechanism to avoid a collision.

Note that, hereinafter, the CP extension used in the mechanism for configuring different transmission start timings for each terminal will be referred to as "CP extension for a plurality of transmission timings".

Figure 2:
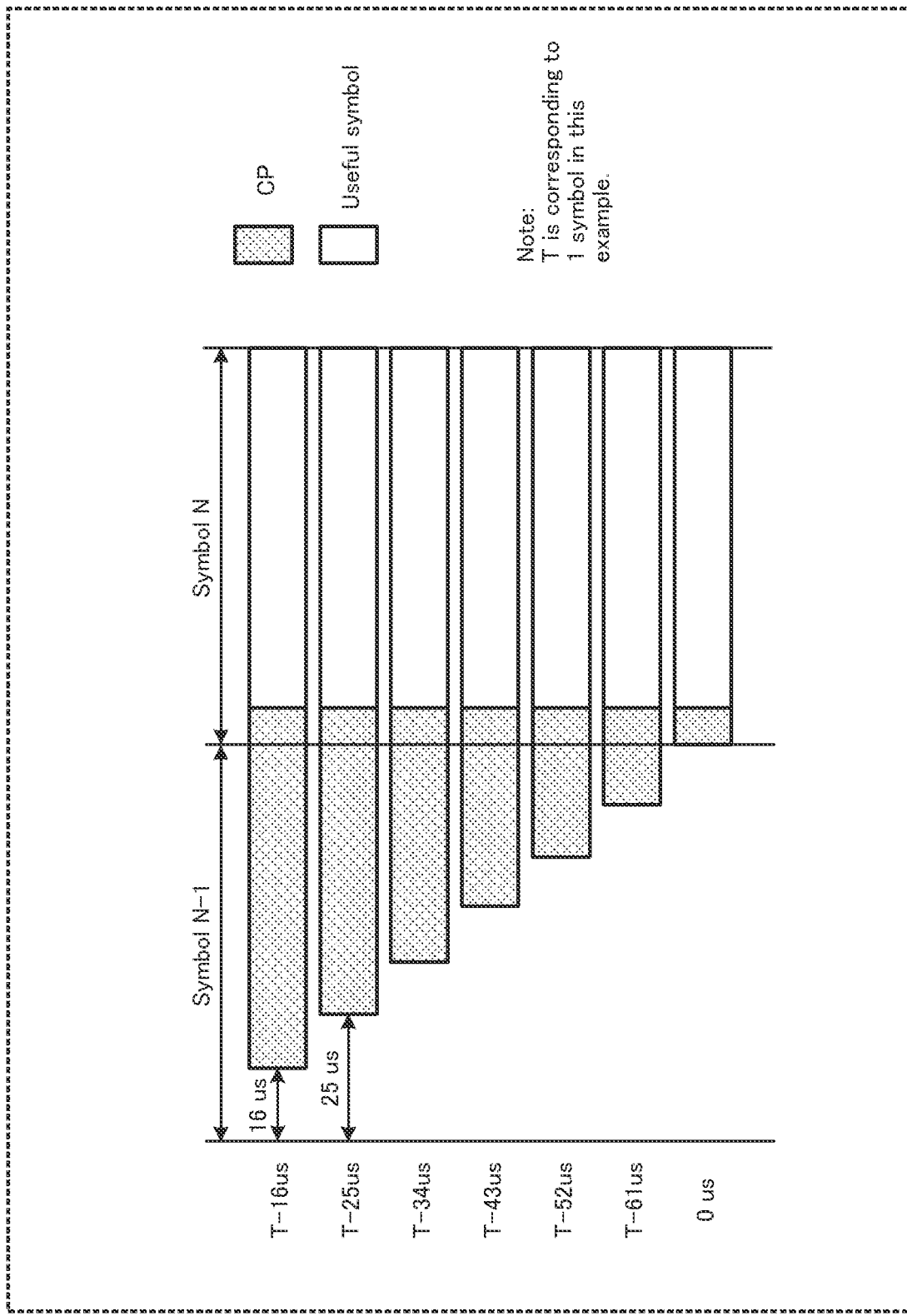
FIG. 2 illustrates exemplary CP extension for a plurality of transmission timings.

FIG. 2 illustrates exemplary CP extension for a plurality of transmission timings. The example illustrated in FIG. 2 indicates CP extension when starting to transmit a PUSCH (e.g., a useful symbol) in symbol N. Further, for example, the subcarrier spacing (SCS) in FIG. 2 is 15 kHz and T indicated in FIG. 2 may correspond to 1 symbol. As illustrated in FIG. 2, the transmission start timing may vary among terminals by configuring different amounts of CP extension (or each of which is also referred to as an amount of extension, a CP extension length, or a CP length) as in "T-16 us", "T-25 us", . . . "T-61 us" or "0 us" for each terminal.

For example, a case where there area certain terminal (e.g., terminal A) and another terminal (e.g., terminal B) whose transmission start timing (with a fewer amount of extension than that in terminal A, for example) is configured after the transmission start timing of terminal A will be described. In this case, when terminal A starts transmission before terminal B, terminal B performs carrier sensing (e.g., LBT), with the result that the channel becomes busy, and terminal B does not start transmission.

As described above, the CP extension for a plurality of transmission timings makes it possible to suppress a transmission collision (in other words, occurrence of interference) among terminals by configuring different amounts of CP extension among the terminals.

[CP Extension in Dynamic Grant (DG)-PUSCH]

In a channel access in an unlicensed band, a gap from the previous transmission (e.g., a duration in which no transmission is performed) may be configured to be a specified length (or equal to or less than the specified length) depending on the type (e.g., category) of the LBT. For example, a gap from the previous transmission may be configured to be 16 us or 25 us.

Accordingly, in the DG-PUSCH, an amount of CP extension for adjusting a gap from the previous transmission may be configured by using a UL grant, for example.

Note that, the CP extension used for gap adjustment with the previous transmission will be referred to as "CP extension for gap adjustment".

In the CP extension for gap adjustment, the amount of CP extension may be configured (e.g., jointly encoded) with a channel access type (or also referred to as an LBT type) and a channel access priority type (CAPC) in DCI format 0_1, for example.

FIG. 3 illustrates exemplary amounts of CP extension (or candidate amounts of CP extension) that can be configured for the CP extension for gap adjustment. In FIG. 3, C1 is a value configured based on the subcarrier spacing (SCS), and C2 and C3 are values configured by higher layer signaling. Further, TA indicates timing alignment. The PUSCH transmission timing in the terminal is caused to match the transmission and reception timings in the base station and therefore may be configured to be earlier by TA than the reception timing in the terminal. On the other hand, since the gap adjustment is performed based on the transmission and reception timings in the terminal (e.g., since the duration between the reception and transmission by the terminal is adjusted), the CP extension for gap adjustment may include TA for the purpose of subtracting the effect of TA. As described above, the CP extension for gap adjustment may include a candidate amount of CP extension obtained by subtracting the effect of TA (in other words, an amount of CP extension calculated based on TA). However, for example, when uplink transmission is immediately followed by transmission, TA is not subtracted at the time of gap adjustment, and thus not every candidate amount of CP extension may be calculated based on TA.

For example, the terminal may perform CP extension in accordance with indication of the CP extension for gap adjustment before PUSCH transmission.

[Scheduling of UE-Initiated COT]

In a case where a UE-initiated COT is semi-statically scheduled (in other words, in a case where an FFP in which the terminal acquires a COT is semi-statically allocated), a delay time in transmission by the base station (or the terminal) may increase. For example, in a case where COT acquisition (in other words, transmission start) is configured at the beginning of a certain FFP with respect to terminal A and terminal A includes no transmission data, a delay time in another terminal B may increase since, even in a case where terminal B (or the base station) includes transmission data (however, in a case where COT acquisition is not configured in the FFP with respect to terminal B), terminal A is allowed to perform transmission, but terminal B is not allowed to perform transmission.

Further, in the FBE, COT acquisition can be performed at the beginning of an FFP, and no COT acquisition timing may be configured at a timing different from the beginning of the FFP (e.g., see ETSI EN 301 893). Accordingly, in a case where there is even no transmission data at the beginning of an FFP, but transmission by a terminal may occur in the middle of the FFP, it is assumed that COT acquisition is performed at the beginning of the FFP.

As described above, a UE-initiated COT scheduling method for a terminal including data to acquire a COT based on the fact that the COT acquisition timing is at the beginning of an FFP (e.g., a constraint of COT acquisition) is expected.

Given the above, in an exemplary embodiment of the present disclosure, a method of improving transmission efficiency in a case where UE-initiated COT scheduling is performed in an unlicensed frequency band will be described.

Embodiment 1

[Overview of Communication System]

Figure 4:
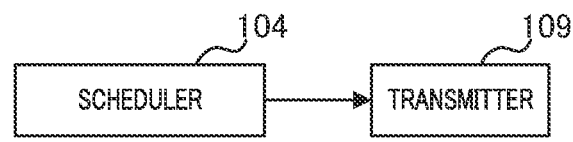
FIG. 4 is a block diagram illustrating an exemplary configuration of a part of a base station.
Figure 5:
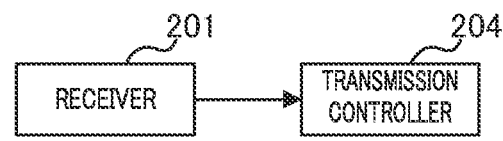
FIG. 5 is a block diagram illustrating an exemplary configuration of a part of a terminal.
Figure 6:
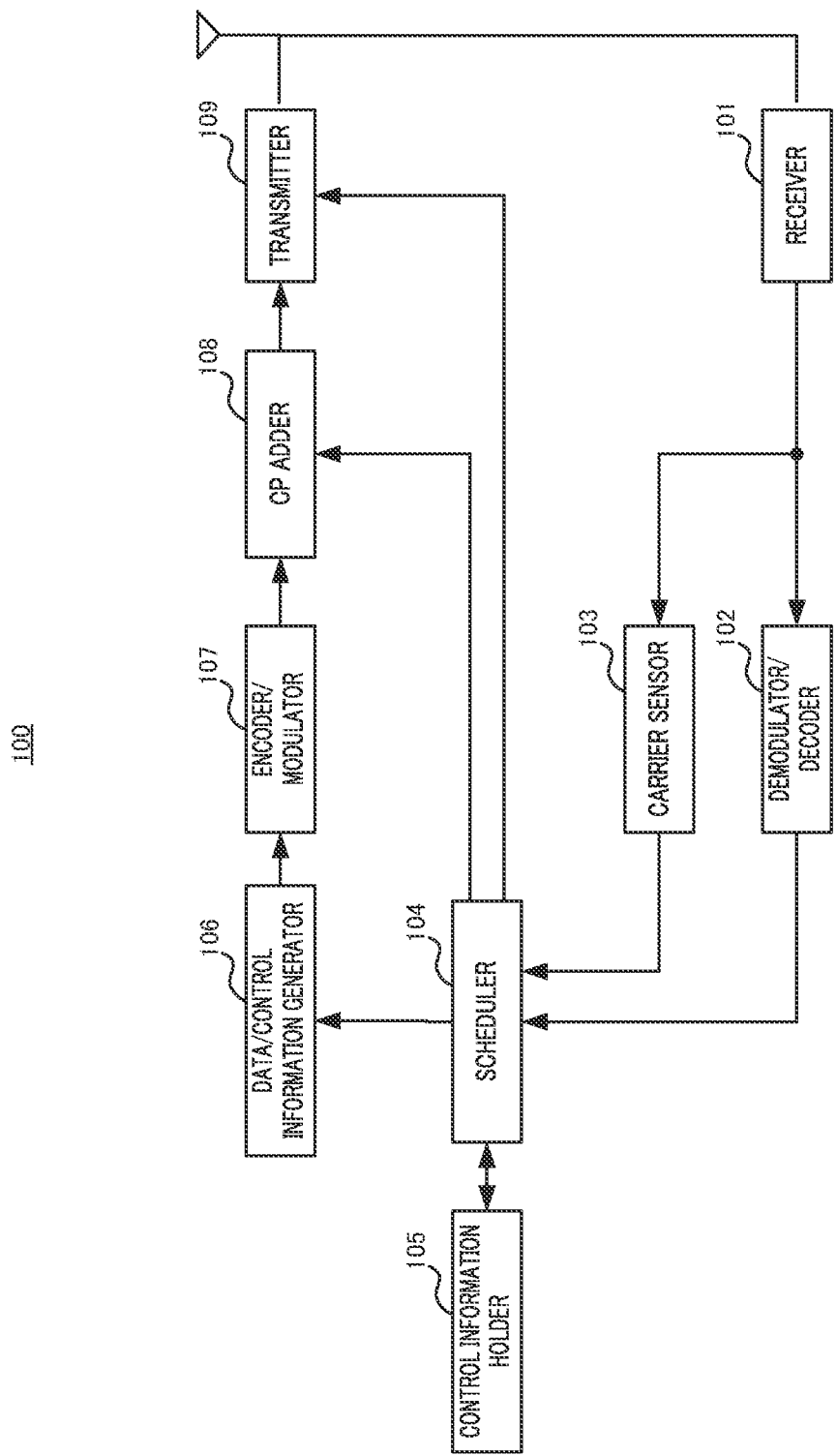
FIG. 6 is a block diagram illustrating an exemplary configuration of the base station.
Figure 7:
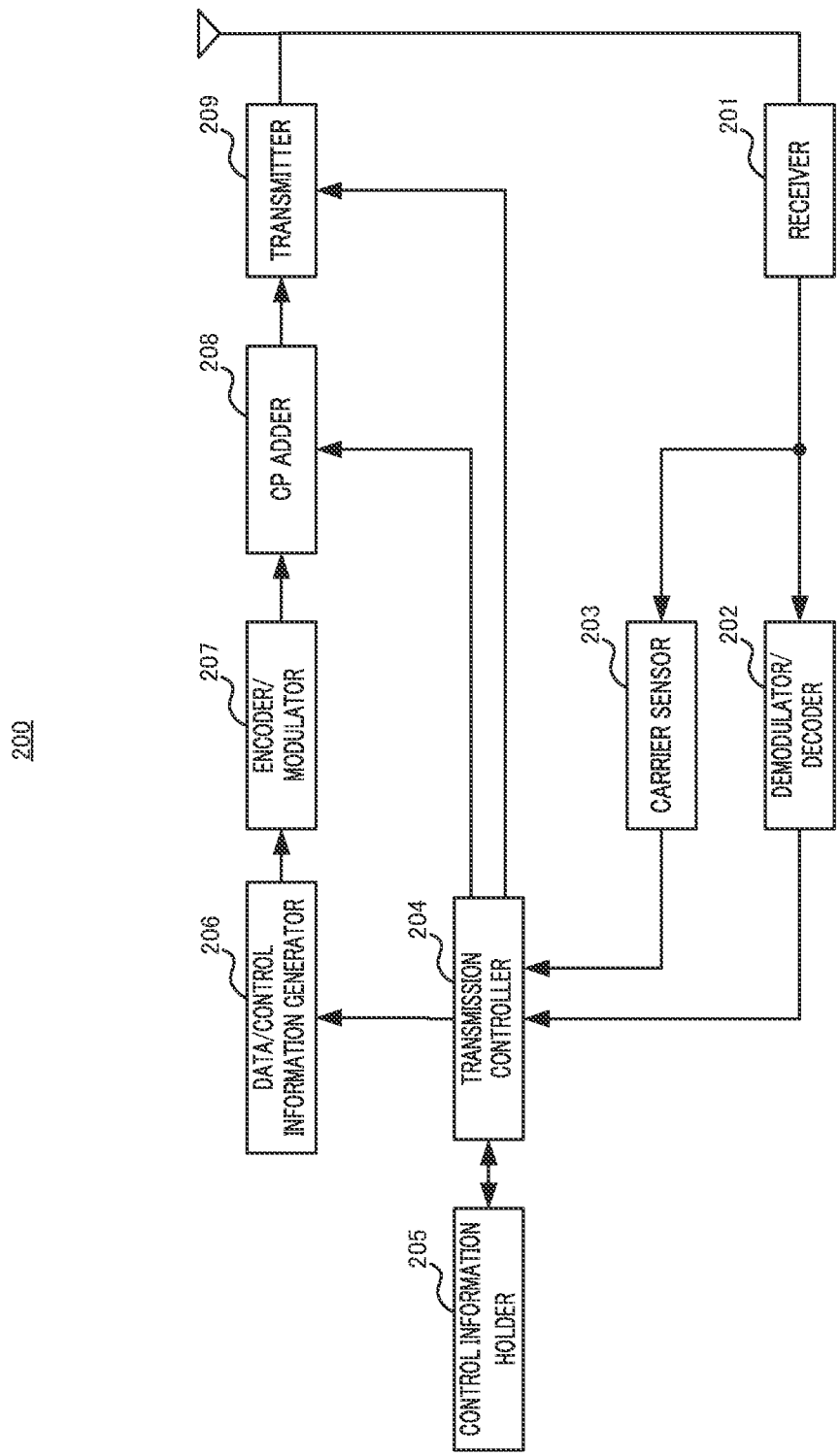
FIG. 7 is a block diagram illustrating an exemplary configuration of the terminal.
Figure 8:
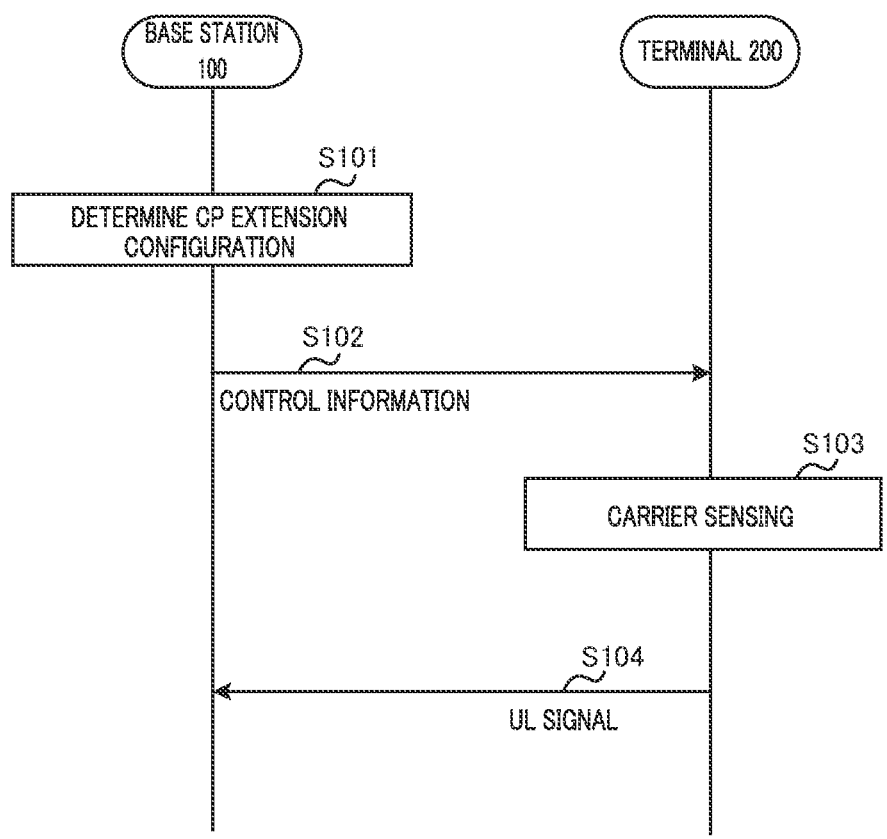
FIG. 8 is a sequence diagram illustrating exemplary operations of the base station and the terminal.

A communication system according to an aspect of the present disclosure may include, for example, base station 100 (e.g., gNB) illustrated in FIGS. 4 and 6 and terminal 200 (e.g., UE) illustrated in FIGS. 5 and 7. The communication system may include a plurality of base stations 100 and a plurality of terminals 200.

FIG. 4 is a block diagram illustrating an exemplary configuration of a part of base station 100 according to an aspect of the present disclosure. In base station 100 illustrated in FIG. 4, scheduler 104 (e.g., corresponding to the control circuitry) determines a CP length (e.g., an amount of CP extension) coordinated between terminal 200 and base station 100. Transmitter 109 (e.g., corresponding to the transmission circuitry) transmits control information (e.g., CP extension configuration information) on the determined CP length to terminal 200.

FIG. 5 is a block diagram illustrating an exemplary configuration of a part of terminal 200 according to an aspect of the present disclosure. In terminal 200 illustrated in FIG. 5, receiver 201 (e.g., corresponding to the reception circuitry) receives control information (e.g., CP extension configuration information) on a CP length coordinated between terminal 200 and base station 100. Transmission controller 204 (e.g., corresponding to the control circuitry) controls uplink transmission (e.g., a COT acquisition timing or a transmission start timing) based on the CP length.

[Configuration of Base Station]

FIG. 6 is a block diagram illustrating an exemplary configuration of base station 100 according to an aspect of the present disclosure. In FIG. 6, base station 100 includes receiver 101, demodulator/decoder 102, carrier sensor 103, scheduler 104, control information holder 105, data/control information generator 106, encoder/modulator 107, cyclic prefix (CP) adder 108, and transmitter 109.

For example, receiver 101 performs reception processing such as down-conversion or A/D conversion on a reception signal received via an antenna, and outputs the reception signal subjected to the reception processing to demodulator/decoder 102 and carrier sensor 103. The reception signal may include, for example, a signal transmitted from terminal 200 (e.g., an uplink signal) or a signal of another system.

Demodulator/decoder 102 demodulates and decodes, for example, the reception signal (e.g., an uplink signal) inputted from receiver 101, and outputs the decoding result to scheduler 104.

Carrier sensor 103 may perform carrier sensing (e.g., LBT), for example, based on the reception signal inputted from receiver 101. For example, carrier sensor 103 may determine whether the channel state is either "busy" or "idle" (in other words, whether the channel is available) based on the reception signal inputted from receiver 101. Carrier sensor 103 outputs information indicating the determined channel state to scheduler 104.

Scheduler 104 determines, for example, CP extension configuration information (which may include, e.g., an amount of CP extension), configured grant (CG) configuration information, or FBE configuration information (which may include, e.g., the period of an FFP or timing) for terminal 200, and outputs the determined CP extension configuration information. CG configuration information or FBE configuration information to control information holder 105.

Further, scheduler 104 may instruct data/control information generator 106 to generate data or control information based on, for example, the decoding result inputted from demodulator/decoder 102. Further, for example, in a case where signaling information including the CP extension configuration information, the CG configuration information or the FBE configuration information is transmitted, scheduler 104 may instruct data/control information generator 106 to generate the signaling information. Further, for example, scheduler 104 may output information on an amount of CP extension at the time of downlink transmission to CP adder 108. Further, for example, scheduler 104 may determine, based on the information indicating the channel state inputted from carrier sensor 103, whether transmission is performed, and may output a transmission instruction to transmitter 109 based on the determination result.

Control information holder 105 holds, for example, control information such as the CP extension configuration information or the CG configuration information for each terminal 200. Control information holder 105 may output, for example, the held information to respective components (e.g., scheduler 104) of base station 100 as needed.

Data/control information generator 106 generates, for example, data or control information in accordance with the instruction from scheduler 104, and outputs a signal including the generated data or control information to encoder/modulator 107. For example, data/control information generator 106 may generate data including signaling information based on the instruction of signaling information generation inputted from scheduler 104, and output the generated data to encoder/modulator 107.

Encoder/modulator 107 encodes and modulates, for example, the signal inputted from data/control information generator 106, and outputs the modulated transmission signal (e.g., a time domain signal) to CP adder 108.

CP adder 108 adds, for example, based on the amount of CP extension inputted from scheduler 104, a CP to the time domain signal inputted from encoder/modulator 107, and outputs the signal, to which the CP has been added, to transmitter 109.

Transmitter 109 performs, for example, transmission processing such as D/A conversion, up-conversion, or amplification on the signal inputted from CP adder 108. Further, transmitter 109 transmits, for example, based on the transmission instruction from scheduler 104, a radio signal obtained by the transmission processing from the antenna to terminal 200.

[Configuration of Terminal]

FIG. 7 is a block diagram illustrating an exemplary configuration of terminal 200 according to an aspect of the present disclosure. In FIG. 7, terminal 200 includes receiver 201, demodulator/decoder 202, carrier sensor 203, transmission controller 204, control information holder 205, data/control information generator 206, encoder/modulator 207. CP adder 208, and transmitter 209.

For example, receiver 201 performs reception processing such as down-conversion or A/D conversion on a reception signal received via an antenna, and outputs the reception signal subjected to the reception processing to demodulator/decoder 202 and carrier sensor 203. The reception signal may include, for example, a signal transmitted from base station 100 (e.g., a downlink signal) or a signal of another system.

Demodulator/decoder 202 demodulates and decodes, for example, the reception signal (e.g., a downlink signal) inputted from receiver 201, and outputs the decoding result to transmission controller 204. The decoding result may include, for example, downlink control information (e.g., a UL grant, slot format information or COT information).

Carrier sensor 203 may perform carrier sensing (or LBT) based on, for example, the reception signal inputted from receiver 201. For example, carrier sensor 203 may determine whether the channel state is either "busy" or "idle" (in other words, whether the channel is available) based on the reception signal inputted from receiver 201. Carrier sensor 203 outputs information indicating the determined channel state to transmission controller 204.

Transmission controller 204 outputs, for example, signaling information (e.g., CP extension configuration information, CG configuration information or FBE configuration information) included in the decoding result inputted from demodulator/decoder 202 to control information holder 205. Further, transmission controller 204 may instruct data/control information generator 206 to generate data or control information based on, for example, control information such as the CG configuration information inputted from control information holder 205 or the downlink control information inputted from demodulator/decoder 202. Further, for example, transmission controller 204 may determine an amount of CP extension at the time of uplink transmission based on the CP extension configuration information, and may output information on the amount of CP extension to CP adder 208. Further, for example, transmission controller 204 may determine, based on the information indicating the channel state inputted from carrier sensor 203, whether transmission is performed, and may output a transmission instruction to transmitter 209 based on the determination result.

Control information holder 205 holds, for example, control information such as the signaling information (e.g., the CP extension configuration information or the CG configuration information) inputted from transmission controller 204, and outputs the held information to respective components (e.g., transmission controller 204) as needed.

Data/control information generator 206 generates, for example, data or control information in accordance with the instruction from transmission controller 204, and outputs a signal including the generated data or control information to encoder/modulator 207.

Encoder/modulator 207 encodes and modulates, for example, the signal inputted from data/control information generator 206, and outputs the modulated transmission signal (e.g., a time domain signal) to CP adder 208.

CP adder 208 adds, for example, based on the amount of CP extension inputted from transmission controller 204, a CP to the time domain signal inputted from encoder/modulator 207, and outputs the signal, to which the CP has been added, to transmitter 209.

Transmitter 209 performs, for example, transmission processing such as D/A conversion, up-conversion, or amplification on the signal inputted from CP adder 208. Further, transmitter 209 transmits, for example, based on the transmission instruction from transmission controller 204, a radio signal obtained by the transmission processing from the antenna to base station 100.

[Operations of Base Station 100 and Terminal 200]

Exemplary operations in base station 100 and terminal 200 having the above configurations will be described.

FIG. 6 is a sequence diagram illustrating exemplary operations of base station 100 and terminal 200.

Base station 100 determines, for example, a CP extension configuration for terminal 200 (S101). The CP extension configuration may include, for example, information on an amount of CP extension (e.g., a CP length) to be configured for terminal 200.

Base station 100 transmits control information to terminal 200 (S102). The control information may include, for example, at least CP extension configuration information. The CP extension configuration information may be indicated to terminal 200 by, for example, at least one of a higher layer signaling (e.g., an RRC signal) and DCI. For example, the CP extension configuration information may be configured for terminal 200 by the higher layer signaling and may be dynamically indicated to terminal 200 by the DCI. Alternatively, with respect to the CP extension configuration information, for example, a plurality of candidate amounts of CP extension may be configured for terminal 200 by the higher layer signaling, and the DCI including a control value (or index) corresponding to one of the candidate amounts of CP extension may be indicated to terminal 200.

Terminal 200 performs, for example, carrier sensing (e.g., LBT) (S103). Terminal 200 may configure, for example, based on the CP extension configuration information, CP extension for an uplink signal. Then, terminal 200 may perform carrier sensing at a transmission start timing in accordance with the CP extension.

For example, in a case where the result of the carrier sensing on the channel is idle, terminal 200 may transmit the uplink signal (S104).

[CG Acquisition Control Method]

An exemplary COT acquisition control method in base station 100 (e.g., scheduler 104) will be described. Terminal 200 (e.g., transmission controller 204) may control, for example, COT acquisition and uplink transmission (e.g., PUSCH transmission) based on control by base station 100.

In the present embodiment, for example, the period and duration of an FFP may be common between base station 100 and terminal 200. Further, in the present embodiment, for example, a duration in which a CP can be extended may be configured before the beginning of the FFP (e.g., immediately before the beginning of the FFP). Note that, a CP extension configurable duration is not limited to a duration before the beginning of FFP, but may be, for example, a duration after the beginning of the FFP (e.g., immediately after the beginning of the FFP) or may also be a duration including the beginning of the FFP (e.g., a duration over a plurality of FFPs).

Figure 9:
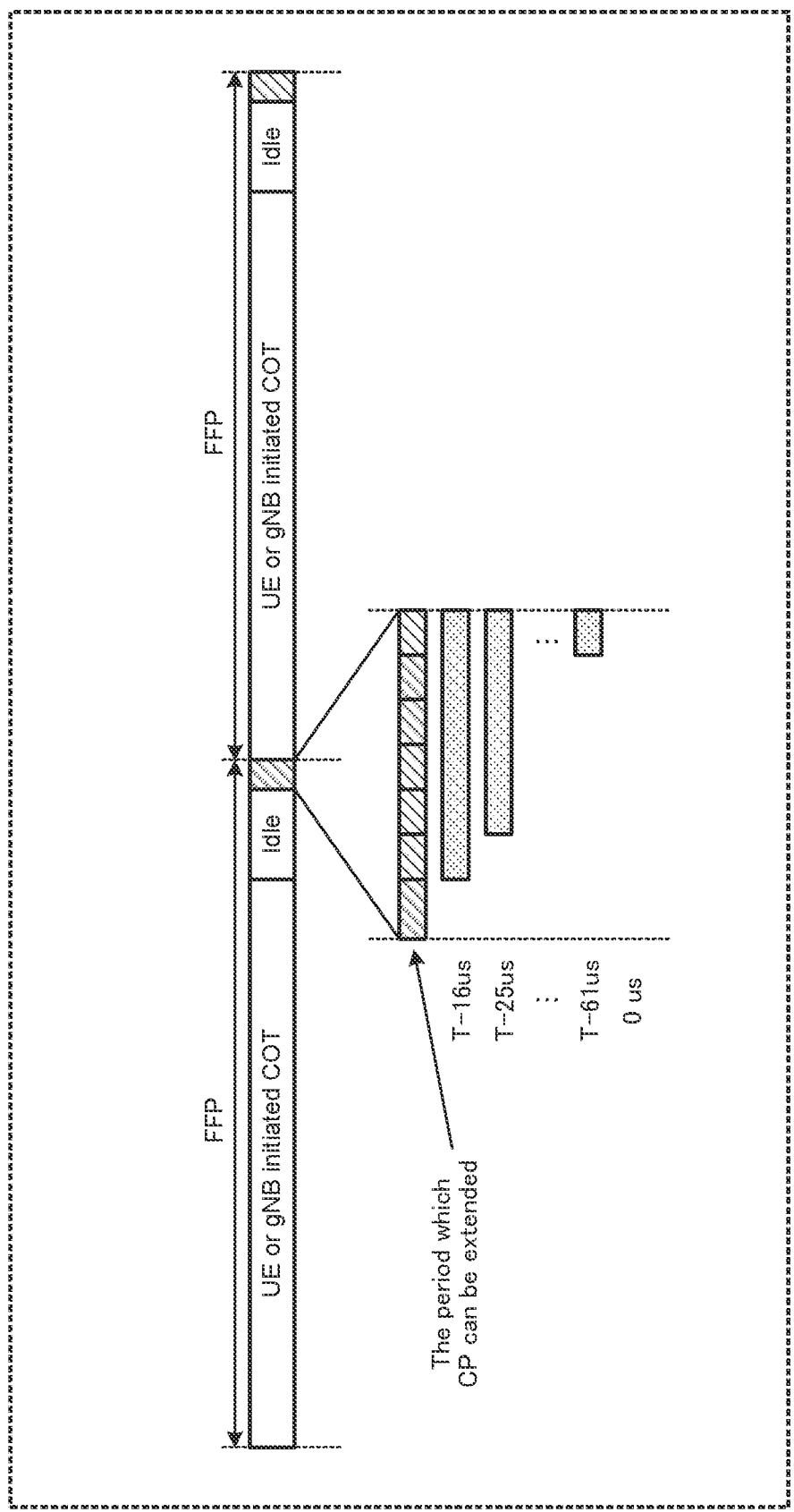
FIG. 9 illustrates exemplary COT acquisition control in FBE according to Embodiment 1.

FIG. 9 illustrates an example in which the CP extension configurable duration is configured immediately before the beginning of an FFP. Note that, in a case where the above-described CP extension configurable duration is configured, the idle period may be configured to be equal to or greater than a specified length (e.g., equal to or greater than 5% of the FFP or equal to or greater than 100 us), for example.

For example, in the CP extension configurable duration, base station 100 may configure an amount of CP extension for each terminal 200 to which base station 100 may perform transmission, and may indicate CP extension configuration information indicating the amount of CP extension to terminal 200. The transmission start timing of each terminal 200 may be determined in accordance with the amount of CP extension configured by base station 100.

In a case where terminal 200 performs transmission, for example, terminal 200 may wait until the transmission start timing based on the amount of CP extension instructed by base station 100, and may start the transmission when the channel is idle as a result of carrier sensing. For example, a terminal that has acquired a COT in each FFP (e.g., a terminal that has first acquired the COT) may be terminal 200 that has started transmission. Note that, in a case where multiplex transmission in the frequency domain or spatial domain can be performed, a plurality of terminals 200 may start transmission within the FFP. In other words, in each FFP, there may be a plurality of terminals 200 that acquires a COT.

Further, in a case where after terminal 200 completes transmission in a certain FFP, a time in which transmission is allowed to be performed remains within the FFP except an idle period, base station 100 may perform downlink transmission after the transmission by terminal 200.

Further, for example, in a case where base station 100 performs COT acquisition and downlink transmission at the beginning of an FFP, the amount of CP extension and the transmission start timing may be determined based on the priority of transmission by base station 100 in comparison with transmission by terminal 200 and the transmission status in terminal 200.

For example, in a case where transmission by base station 100 is prioritized over that by terminal 200, base station 100 may configure the amount of CP extension for base station 100 to be larger than that for terminal 200. This configuration of the amount of CP extension makes it easier for base station 100 to acquire a COT by, for example, making the transmission start timing in base station 100 earlier than that in terminal 200, and enables base station 100 to perform transmission whose priority is higher than that of terminal 200.

Further, for example, in a case where none of terminals 200 performs transmission at the beginning of an FFP (or in a case where, among terminals 200 capable of performing transmission in the FFP, even terminal 200 for which the shortest CP extension is configured does not start transmission), base station 100 may start transmission and acquire a COT. Thus, for example, it is possible to suppress generation of a status in which none of terminals 200 and base station 100 performs transmission in the FFP (in other words, a status in which the FFP is not utilized), and it is possible to improve transmission efficiency in an unlicensed frequency band.

As described above, base station 100 may determine an amount of CP extension coordinated between terminal 200 and base station 100 (e.g., an amount of CP extension for a plurality of transmission timings). Further, for example, terminal 200 may control uplink transmission based on CP extension configuration information (e.g., an amount of CP extension for a plurality of transmission timings) indicated by base station 100.

For example, since the configuration of the amount of CP extension makes it easier for terminal 200 (or base station 100) having a high priority to acquire a COT by prioritizing COT acquisition by terminal 200 or base station 100, it is possible to reduce a transmission delay. For example, the configuration of the amount of CP extension enables base station 100 to configure the priority of transmissions by base station 100 to be higher than that of transmission by terminal 200. Thus, since base station 100 can dynamically perform COT acquisition and downlink transmission based on, for example, the priorities of transmission by base station 100 and transmission by terminal 200, it is possible to improve scheduling flexibility.

Further, for example, in a case where none of terminals 200 performs transmission in a certain FFP based on the transmission status in terminals 200, base station 100 can suppress generation of a status in which the FFP is not utilized, by determining the transmission by base station 100 (in other words, acquiring a COT). Further, for example, since base station 100 and terminal 200 are allowed to perform transmission even in a case where data is generated in the middle of an FFP (in other words, at a timing different from the timing of the beginning of the FFP), it is possible to reduce a delay time in transmission.

As described above, for example, even when a UE-initiated COT is performed in a case where the COT acquisition timing is at the beginning of an FFP, it is possible to improve efficiency of scheduling with respect to base station 100 and terminal 200. Accordingly, the present embodiment makes it possible to improve transmission efficiency in a case where UE-initiated COT scheduling is performed in an unlicensed frequency band.

Note that, a plurality of amounts of CP extension may be configured for one terminal 200. For example, different amounts of CP extension may be configured (e.g., an amount of CP extension may be periodically changed) among FFPs. This configuration of the amount of CP extension may cause, for example, a larger amount of CP extension to be configured in a certain FFP and a fewer amount of CP extension to be configured in another FFP. As described above, since the priority of COT acquisition with respect to each terminal 200 varies among FFPs, the fairness of priority with respect to COT acquisition among a plurality of terminals 200 can be improved. Further, for example, an operation in which, with respect to one terminal 200, a plurality of candidate amounts of CP extension is configured in the same FFP (e.g., random selection) and selection from the plurality of candidate amounts is performed may be configured. This operation makes it possible, for example, to change the priorities for COT acquisition in one terminal 200 and to improve the fairness of priority with respect to COT acquisition among terminals 200.

Further, for example, base station 100 may perform prioritization for COT acquisition among terminals 200 (or between terminal(s) 200 and base station 100) not only by the configuration of the amount of CP extension, but also by the configuration of the transmission timing of data. For example, base station 100 may configure a transmission timing of data, which is configured for terminal 200 or base station 100 with a high priority, earlier. For example, base station 100 may configure a transmission timing in terminal 200 with a high priority to a timing earlier than that in another terminal 200 by one symbol. This configuration enables terminal 200 or the base station with a high priority to perform higher-priority transmission than another terminal.

Embodiment 2

In exemplary configurations of the base station and the terminal according to the present embodiment, for example, some functions may be different from the functions in Embodiment 1 and the other functions may be the same as the functions in Embodiment 1.

As described above, for example, the CP extension in a DG-PUSCH is the CP extension for gap adjustment used for adjusting a gap length. Further, for example, the control method in Embodiment 1 (e.g., the method of controlling the priority of transmission by terminal 200 or base station 100 by configuring a plurality of transmission start timings at the beginning of an FFP) may be applied to the DG-PUSCH. In other words, the CP extension for a plurality of transmission timings may be supported for the DG-PUSCH.

However, the CP extension for gap adjustment may be supported at the time of PUSCH transmission by base station 100 within a COT (e.g., gNB COT).

Accordingly, in the present embodiment, a method of configuring both the CP extension for a plurality of transmission timings and the CP extension for gap adjustment for the DG-PUSCH will be described, for example. In the present embodiment, the PUSCH is not limited to the DG-PUSCH, but may be the CG-PUSCH.

In base station 100 (FIG. 6), for example, when CP extension configuration information (e.g., an amount of CP extension) for each terminal 200 is determined, scheduler 104 may individually configure CP extension configuration information to be applied within a COT (e.g., gNB COT) acquired by base station 100, and CP extension configuration information to be applied in a duration different from the COT of base station 100 (e.g., the beginning of an FFP). For example, scheduler 104 outputs the determined CP extension configuration information to control information holder 105. Further, for example, scheduler 104 may use the CP extension configuration information to transmit signaling information and to schedule PUSCH transmission for terminal 200.

In terminal 200 (FIG. 7), for example, transmission controller 204 may determine, based on the control information inputted from control information holder 205, such as the configured grant configuration information and the FBE configuration information, or the decoding result inputted from demodulator/decoder 202, whether a PUSCH to be transmitted is within a COT (e.g., gNB COT) of base station 100. Transmission controller 204 may determine an amount of CP extension to be applied to the PUSCH based on the determination result and the CP extension configuration information and may output information on the determined amount of CP extension to CP adder 208.

[Operations of Base Station 100 and Terminal 200]

Exemplary operations in base station 100 and terminal 200 having the above configurations will be described.

In the present embodiment, for example, combinations each including a plurality of candidate amounts of CP extension (e.g., candidate CP lengths) that can be indicated by the CP extension configuration information may vary for respective types of COT. For example, base station 100 may cause the control information to include one of a plurality of candidate CP lengths included in one of the combinations varying for the respective types of COT. Further, for example, terminal 200 may determine, based on the control information indicated by base station 100, one amount of CP extension from a plurality of candidate CP lengths included in at least one of the combinations that corresponds to a type of COT.

The types of COT may include, for example, the gNB COT and a duration different from the gNB COT.

For example, exemplary COT acquisition control methods in cases where a PUSCH to be transmitted by terminal 200 is a "DG-PUSCH", a "type 1 CG PUSCH", and a "type 2 CG PUSCH" will be described. Terminal 200 may perform COT acquisition and PUSCH transmission based on the control information from base station 100, for example.

<Case of DG-PUSCH>

For example, two types of table may be configured which are a table for configuring an amount of CP extension to be applied within a COT (gNB COT) of base station 100 (e.g., an exemplary association between an index and an amount of CP extension for gap adjustment), and a table for configuring an amount of CP extension to be applied within a duration different from the COT of base station 100 (e.g., an exemplary association between an index and an amount of CP extension for a plurality of transmission timings).

The table to be applied within the gNB COT (referred to as "table 1", for example) may be used, for example, to indicate the CP extension for gap adjustment. Further, the table to be applied within a duration different from the gNB COT (referred to as "table 2", for example) may be used, for example, to indicate the CP extension for a plurality of transmission timings.

For example, table 1 may or may not include other parameters such as the channel access type and the CAPC in addition to the amount of CP extension for gap adjustment. Further, for example, table 2 may or may not include parameters different from the CP extension for a plurality of transmission timings. For example, a reduction in configuration candidates for parameters in table 2 makes it possible to reduce the table size.

Further, for example, a common index may be configured in tables 1 and 2. In other words, base station 100 and terminal 200 may determine the table to be applied (or to refer to) in COT acquisition and PUSCH transmission between tables 1 and 2 in accordance with a type of COT (or a transmission timing).

For example, terminal 200 may determine the table to refer to, based on whether the timing of transmitting a PUSCH is within the COT (gNB COT) of base station 100. For example, terminal 200 may determine whether it is the gNB COT, based on COT information (e.g., COT duration) included in FBE configuration information and downlink control information (e.g., DCI format 2_0). For example, in a case where transmission at the beginning of an FFP is instructed based on the FBE configuration information, terminal 200 may determine that it is a duration different from the gNB COT, and select table 2. Further, for example, terminal 200 may determine a continuation time of the COT based on the COT information, may determine, when the timing at which the transmission is instructed is within the continuation time of the COT, that the timing is within the gNB COT, and may select table 1.

For example, base station 100 may indicate an index to refer to within the table to terminal 200. For example, the index may be indicated to terminal 200 by using a UL grant. For example, terminal 200 may configure one of a plurality of candidate amounts of CP extension within the selected table by the index included in the control information (e.g., CP extension configuration information) indicated by base station 100.

FIG. 10 illustrates exemplary tables 1 and 2 for configuring CP extension.

Table 1 illustrated in FIG. 10 is, for example, a table to be applied within the COT of base station 100, and the CP extension for gap adjustment may be configured. Note that, although table 1 includes the amount of CP extension in the example illustrated in FIG. 10, the present disclosure is not limited thereto, and table 1 may include an index of another table that defines the amount of CP extension for gap adjustment (e.g., the index in Table 5.3.1-1 of NPL 1), for example.

Further, table 1 illustrated in FIG. 10 may include, for example, the channel access type and the CAPC in addition to the amount of CP extension. As an example, the amount of CP extension may be configured (e.g., jointly encoded) with the channel access type and the CAPC in DCI format 0_1. Note that, table 1 may not include at least one of the channel access type and the CAPC, and may include any other parameter.

Table 2 illustrated in FIG. 10 is, for example, a table to be applied within a duration different from the COT of base station 100, and the CP extension for a plurality of transmission timings may be configured. Note that, although table 2 includes the amount of CP extension in the example illustrated in FIG. 10, the present disclosure is not limited thereto, and table 2 may include an index of another table that defines the amount of CP extension for a plurality of transmission timings (e.g., the index in Table 5.3.1-2 of NPL 1), for example.

Further, table 2 illustrated in FIG. 10 may include, for example, the CAPC in addition to the amount of CP extension. As an example, the amount of CP extension may be configured (e.g., jointly encoded) with the CAPC. Note that, table 2 may not include the CAPC, and may include any other parameter.

For example, at least one candidate amount of CP extension included in table 1 (e.g., a combination of candidate CPs) corresponding to the COT (e.g., the first type) of base station 100 may be based on timing alignment (TA) and a channel access type (or a category of the LBT). On the other hand, candidate amount lengths of CP extension included in table 2 corresponding to a duration (e.g., the second type) different from the COT of base station 100 may not be based on the TA and the channel access type. Further, for example, the granularity of the amount of CP extension included in table 2 may be finer than the granularity of the amount of CP extension included in table 1.

As described above, the CP extension for a plurality of transmission timings in addition to the CP extension for gap adjustment can be configured for the DG-PUSCH. Thus, for example, base station 100 can configure both CG-PUSCH and DG-PUSCH transmissions (e.g., CP extension for a plurality of transmission timings) in COT acquisition at the beginning of an FFP (e.g., a duration different from the gNB COT), and thus the degree of freedom of scheduling in base station 100 can be improved.

Further, for example, even in a case where a CG-PUSCH and a DG-PUSCH are mixedly present, base station 100 may configure priorities (e.g., different amounts of CP extension) for the CG-PUSCH and the DG-PUSCH and perform scheduling. Thus, for example, base station 100 can prioritize PUSCH transmission with a shorter delay configuration regardless of the CG-PUSCH and the DG-PUSCH and therefore can reduce a delay time.

Further, for example, with respect to the configurations of amounts of CP extension for the CP extension for gap adjustment and the CP extension for a plurality of transmission timings, a case where two tables are used as illustrated in FIG. 10 makes it possible to reduce the size of the individual tables (in other words, the number of indexes) in comparison with a case where one table is used, and thus signaling overhead at the time of index indication can be reduced.

Note that, for example, the present disclosure is not limited to the two tables in accordance with types of COT as in FIG. 10, but may be configured such that an amount of CP extension for gap adjustment and an amount of CP extension for a plurality of transmission timings are mixedly present in one table. In this case, for example, when an index of another table that defines the amount of CP extension is referred to, it may be explicitly configured (or defined) which CP extension (in other words, which another table) it is. FIG. 11 illustrates an example in which one table includes amounts of CP extension for gap adjustment and amounts of CP extension for a plurality of transmission timings. In FIG. 11, for example, indexes in a plurality of tables (e.g., tables 1 and 2) may be configured.

Further, for example, the table (or a combination of CP extensions for a plurality of transmission timings) to be applied in a duration different from the gNB COT is not limited to one table, but a plurality of tables may be configured. For example, the respective granularities of the amounts of CP extension for a plurality of transmission timings in a plurality of tables to be applied in a duration different from the gNB COT may be different.

<Case of Type 1 CG PUSCH>

In the type 1 CG, for example, CP extension (e.g., CP extension for gap adjustment) to be applied within a COT (e.g., gNB COT) of base station 100 and CP extension (e.g., CP extension for a plurality of transmission timings) to be applied in a duration different from the COT of base station 100 may be semi-statically individually configured for terminal 200.

Terminal 200 may determine, for example, CP extension to be applied to the type 1 CG PUSCH based on whether the CP extension is within the COT of base station 100.

As described above, different types of CP extension can be configured for the type 1 CG-PUSCH. Thus, for example, base station 100 can use different CP extensions within the gNB COT and outside of the gNB COT by switching the CP extensions therebetween in the type 1 CG, and thus the degree of freedom of scheduling in base station 100 can be improved.

Note that, when CP extensions are not selectively used as in a case where CG transmission is performed in a duration different from a COT of base station 100 (e.g., the beginning of an FFP) (in other words, in a case where the CG transmission is not performed in the COT of base station 100), one type of amount of CP extension may be configured.

<Case of Type 2 CG PUSCH>

In the type 2 CG, for example, activation is performed by a PDCCH (or DCI), and thus a method of using two tables in accordance with types of COT (e.g., FIG. 10) may be applied in the same manner as with the DG-PUSCH.

For example, a table to be applied within a COT of base station 100 (e.g., table 1 illustrated in FIG. 10) and a table to be applied in a duration different from the COT of base station 100 (e.g., table 2 illustrated in FIG. 10) may be configured.

For example, terminal 200 may determine a table to refer to, based on whether the timing of transmitting a CG-PUSCH is within a COT (gNB COT) of base station 100. Further, for example, an index corresponding to the table determined by terminal 200 may be configured (or indicated) to terminal 200 by a PDCCH for activation. Further, for example, the index to be configured for terminal 200 may be used until CG-PUSCH transmission is stopped by de-activation or is activated again.

As described above, different types of CP extension can be configured for the type 2 CG-PUSCH. Thus, for example, base station 100 can use different CP extensions within the gNB COT and outside of the gNB COT by switching the CP extensions therebetween in the type 2 CG. Further, for example, base station 100 can dynamically configure an amount of CP extension to each terminal 200 by a PDCCH for activation. Thus, the degree of freedom of scheduling in base station 100 can be improved for the type 2 CG-PUSCH.

Note that, in the type 2 CG, different types of CP extension may be semi-statically configured in the same manner as in the type 1 CG. Further, for example, when CP extensions are not selectively used as in a case where CG transmission is performed in a duration different from a COT of base station 100 (e.g., the beginning of an FFP) (in other words, in a case where the CG transmission is not performed in the COT of base station 100), one type of amount of CP extension may be configured.

Exemplary COT acquisition control methods have been described, thus far.

As described above, in the present embodiment, combinations (e.g., tables) each including a plurality of candidate amounts of CP extension with respect to an amount of CP extension indicated by the CP extension configuration information may vary for respective types of COT. For example, base station 100 can control the CP extension for a plurality of transmission timings for both the DG-PUSCH and the CG-PUSCH. Thus, base station 100 can reduce a delay in PUSCH transmission by terminal 200 by configuring, for example, an amount of CP extension in accordance with a type (e.g., service type or delay request) of each PUSCH transmission for both the DG-PUSCH and the CG-PUSCH.

Note that, the COT acquisition control method in Embodiment 1 (e.g., the method of controlling the priority of transmission by terminal 200 or base station 100 by configuring a plurality of transmission start timings at the beginning of an FFP) may be applied to the COT acquisition control methods in the present embodiment or any other control method may be applied thereto.

Embodiment 3

In exemplary configurations of the base station and the terminal according to the present embodiment, for example, some functions may be different from the functions in Embodiment 1 and the other functions may be the same as the functions in Embodiment 1.

[Time Domain Scheduling]

When time domain scheduling is performed in a DG-PUSCH, a PUSCH transmission timing with a timing, at which a UL grant is received, as the starting point may be instructed to terminal 200.

For example, in a case where, in comparison with scheduling within an FFP, a DG-PUSCH at the beginning of the following FFP is instructed (or scheduled) to the terminal, scheduling may be temporally more distant. For example, the longest period of the FFP may be 10 ms.

As an example of covering temporally distant scheduling, a method of increasing the number of bits for parameters for time domain scheduling (e.g., a time domain resource assignment (TDRA) field in a UL grant) or a method of decreasing the degree of freedom of scheduling can be mentioned. As an example of the method of reducing the degree of freedom of scheduling, a method of increasing candidates for temporally distant scheduling instead of reducing candidates for temporally closer scheduling can be mentioned.

[Operation at the Time of Failure of COT Acquisition]

In terminal 200, for example, DG-PUSCH transmission may cause no COT to be acquired due to interference or the like even when COT acquisition is attempted at the beginning of an FFP. As described above, in the FBE, a COT is not acquired at a timing in the middle different from the beginning of an FFP. Accordingly, when COT acquisition fails at the beginning of an FFP, terminal 200 waits for rescheduling from base station 100 at least until the next FFP, and thus a delay time may increase.

Given the above, for example, a method of suppressing an increase in a delay time in PUSCH transmission will be described in the present embodiment.

In base station 100 (FIG. 6), for example, when CP extension configuration information (e.g., an amount of CP extension) for each terminal 200 is determined, scheduler 104 may configure COT acquisition configuration information.

The COT acquisition configuration information may include, for example, information on time domain scheduling (e.g., information that differs from the amount of CP extension). The information on time domain scheduling may include, for example, at least one of information indicating a start timing of scheduling with respect to terminal 200 (corresponding to "next FFP" to be described later) and information indicating a candidate timing of a COT for terminal 200 (or a re-attempt timing of COT acquisition) (corresponding to "re-attempt" to be described later).

For example, scheduler 104 outputs the determined CP extension configuration information and COT acquisition configuration information to control information holder 105. Further, for example, scheduler 104 may use the CP extension configuration information and the COT acquisition configuration information to transmit signaling information and to schedule PUSCH transmission by terminal 200.

In terminal 200 (FIG. 7), transmission controller 204 may determine a PUSCH transmission timing and instruct data/control information generator 206 to generate data or control information based on, for example, the control information inputted from control information holder 205, such as the configured grant configuration information and the FBE configuration information, or the downlink control information (e.g., the CP extension configuration information) and the COT acquisition configuration information that are inputted from demodulator/decoder 202.

[Operations of Base Station 100 and Terminal 200]

Exemplary operations in base station 100 and terminal 200 having the above configurations will be described.

For example, exemplary COT acquisition control methods in base station 100 (e.g., scheduler 104) will be described. Terminal 200 (e.g., transmission controller 204) may control COT acquisition and uplink transmission (e.g., PUSCH transmission) based on control by base station 100, for example.

<Control Method 1>

In control method 1, for example, signaling to indicate information (e.g., "next FFP") indicating a start timing of time domain scheduling with respect to terminal 200 may be added as exemplary COT acquisition configuration information.

For example, in time domain scheduling for a DG-PUSCH, a timing at which a UL grant is received may be a starting point. In control method 1, on the other hand, in a case where a "next FFP" is indicated to terminal 200, for example, base station 100 may perform the time domain scheduling for a DG-PUSCH with the beginning of an FFP (e.g., an FFP after a timing at which a UL grant is received) corresponding to the next FFP as the starting point.

For example, the FFP corresponding to the next FFP may be an FFP next to the current FFP. Note that, the current FFP is, for example, an FFP at a timing at which a UL grant is received, and the FFP next thereto may be an FFP of the next period with respect to the current FFP.

Hereinafter, exemplary next FFP indication will be described.

Example 1

For example, the "next FFP" may be indicated to terminal 200 by a one-bit flag.

For example, the starting point of time domain scheduling may be configured for terminal 200 by the one-bit flag corresponding to the next FFP. As an example, the next FFP="0" may mean that a UL grant is the starting point and the next FFP="1" may mean that the beginning of an FFP next to a timing at which a UL grant is received is the starting point.

For example, the next FFP (one-bit flag) may be indicated (jointly encoded) together with the amount of CP extension (e.g., CP extension configuration information) to terminal 200 or the next FFP and the amount of CP extension may be individually indicated to terminal 200 in the field of a UL grant.

FIG. 12 illustrates an example in which a next FFP is indicated together with an amount of CP extension (and a CAPC). For example, in the table illustrated in FIG. 12 (e.g., an exemplary association among an index, an amount of CP extension, a CAPC, and a next FFP) may be preconfigured from base station 100 to terminal 200. Note that, the table illustrated in FIG. 12 is exemplary. For example, the parameters included in the table may not include the CAPC and may include any other parameter different from the CAPC.

The indication of the "next FFP" to terminal 200 as described above enables base station 100 to perform scheduling, for example, with the beginning of an FFP next to an FFP of a timing, at which a UL grant is received, as the starting point. The parameters (e.g., TDRA) for time domain scheduling with respect to terminal 200 may be the same as, for example, the parameters with a timing, at which a UL grant is received, as the starting point. Thus, it is possible to reduce signaling overhead of the parameters (e.g., TDRA) for time domain scheduling and to improve the degree of freedom of scheduling in a time domain.

Note that, the starting point of time domain scheduling indicated to terminal 200 by the next FFP is not limited to an FFP next to an FFP where a UL grant is received, but may be any FFP after the FFP where the UL grant is received.

Example 2

For example, the "next FFP" may be indicated to terminal 200 by an M-bit field.

For example, the starting point of time domain scheduling may be configured for terminal 200 by an M-bit field corresponding to the next FFP. For example, it may be indicated after how many FFPs from a timing at which a UL grant is received an FFP is configured as the starting point of time domain scheduling by the next FFP. For example, the next FFP="0" may mean that the UL grant is the starting point and the next FFP="m" may mean that the beginning of an FFP after m FFPs from a timing at which the UL grant is received is the starting point. Note that, m may represent a value to be indicated in an M-bit field, for example.

For example, the next FFP (e.g., an M-bit field) may be indicated (joint encoded) together with the amount of CP extension (e.g., CP extension configuration information) or the next FFP and the amount of CP extension may be individually indicated in the field of a UL grant. For example, in a case where the next FFP is indicated together with the amount of CP extension, the table illustrated in FIG. 12 may be preconfigured from base station 100 to terminal 200 in the same manner as in Example 1.

The indication of the "next FFP" to terminal 200 in an M-bit field as described above enables base station 100 to perform scheduling, for example, with the beginning of an FFP further after or the beginnings of more FFPs in comparison with that in Example 1 as the starting point(s). Further, the parameters (e.g., TDRA) for time domain scheduling with respect to terminal 200 may be the same as, for example, the parameters with a timing, at which a UL grant is received, as the starting point. Thus, it is possible to reduce signaling overhead of the parameters (e.g., TDRA) for time domain scheduling and to improve the degree of freedom of scheduling.

<Control Method 2>

In control method 2, for example, signaling to indicate information indicating a re-attempt at COT acquisition when terminal 200 fails to acquire a COT (e.g., "re-attempt") may be added as exemplary COT acquisition configuration information.

For example, when the re-attempt is instructed, terminal 200 may re-attempt COT acquisition in an FFP corresponding to the "re-attempt" in a case where COT acquisition fails in a scheduled FFP.

For example, the FFP corresponding to the re-attempt may be an FFP next to the current FFP. Note that, the current FFP is, for example, an FFP at a timing at which a UL grant is received, and the FFP next thereto may be an FFP of the next period with respect to the current FFP.

Hereinafter, exemplary re-attempt indication will be described.

Example 1

For example, the re-attempt at COT acquisition may be indicated to terminal 200 by a one-bit flag.

For example, terminal 200 may be instructed, by a one-bit flag corresponding to the re-attempt, whether COT acquisition is re-attempted at the time of failure of COT acquisition. As an example, the re-attempt="0" may mean that no re-attempt is performed even when COT acquisition fails, and the re-attempt="1" may mean that, when COT acquisition fails, COT acquisition is re-attempted in the next FFP.

Further, for example, in a case where COT acquisition at the time of the re-attempt in the next FFP fails, it may be preconfigured or predefined whether COT acquisition is further re-attempted or how many times the re-attempt is performed. For example, the number of re-attempts may be once or a plurality of times.

Further, an amount of CP extension may be changed at the time of a re-attempt at COT acquisition. For example, the priority of transmission with respect to terminal 200 may be configured to be high by an increase in the amount of CP extension at the time of the re-attempt. Since an increase in the priority makes it possible to heighten the possibility of COT acquisition, a delay time can be reduced. Alternatively, for example, the priority of transmission with respect to terminal 200 may be configured to be low by a decrease in the amount of CP extension at the time of the re-attempt. By a decrease in the priority, transmission to be directly scheduled may be prioritized over transmission to be re-attempted by the re-attempt among a plurality of terminals 200 (or between terminal(s) 200 and the base station), for example. Note that, a change in an amount of CP extension at the time of a re-attempt may be preconfigured or predefined.

For example, the re-attempt (one-bit flag) may be indicated (joint encoded) together with the amount of CP extension (e.g., CP extension configuration information) to terminal 200 or the re-attempt and the amount of CP extension may be individually indicated to terminal 200 in the field of a UL grant.

FIG. 13 illustrates an example in which a re-attempt is indicated together with an amount of CP extension (and a CAPC). For example, the table illustrated in FIG. 13 (e.g., an association among an index, an amount of CP extension, a CAPC, and a re-attempt) may be preconfigured from base station 100 to terminal 200. Note that, the table illustrated in FIG. 13 is exemplary. For example, the parameters included in the table may not include the CAPC and may include any other parameter different from the CAPC.

The indication of an instruction regarding a re-attempt at COT acquisition (re-attempt) to terminal 200 as described above makes it possible to reduce a delay time since even when COT acquisition in an FFP scheduled by base station 100 fails, for example, terminal 200 may be able to perform uplink transmission without waiting for scheduling from base station 100 by re-attempting COT acquisition in the next FFP.

Note that, the timing of re-attempting COT acquisition indicated to terminal 200 by the re-attempt is not limited to an FFP next to an FFP where a UL grant is received, but may be any FFP after the FFP where the UL grant is received.

Example 2

For example, an instruction regarding a re-attempt at COT acquisition (e.g., a re-attempt) may be indicated to terminal 200 by an M-bit field.

For example, a condition when COT acquisition is re-attempted at the time of failure of COT acquisition may be instructed to terminal 200 by an M-bit field corresponding to the re-attempt.

For example, the number of re-attempts to be performed may be instructed to terminal 200 by an M-bit field. Since the instruction of the number of re-attempts enables base station 100 to dynamically configure (e.g., change) the number of re-attempts based on, for example, the state of terminal 200 within a cell (e.g., the presence or absence of terminal 200 including high-priority data), it is possible to reduce a delay time and to realize an improved degree of freedom of scheduling.

Further, for example, a condition for a re-attempt as in "a re-attempt in the case of a UL symbol" or "a re-attempt in the case of either a UL symbol or a flexible symbol" may be instructed (or designated) to terminal 200 by an M-bit field. Since the instruction of the condition for a re-attempt enables base station 100 to instruct terminal 200 to re-attempt COT acquisition at a timing satisfying the condition (e.g., the type of symbol), for example, it is possible to improve the degree of freedom of scheduling in base station 100.

Further, for example, configuration of (e.g., an increase or decrease in) an amount of CP extension at the time of a re-attempt may also be indicated together by an M-bit field. For example, since the amount of CP extension in an attempt (including a re-attempt, for example) at COT acquisition can be dynamically configured thereby, it is possible to realize a reduced delay time and an improved degree of freedom in base station 100.

Further, for example, the re-attempt (M-bit field) may be indicated (jointly encoded) together with the amount of CP extension (e.g., CP extension configuration information) to terminal 200 or the re-attempt and the amount of CP extension may be individually indicated to terminal 200 in the field of a UL grant. For example, in a case where the re-attempt is indicated together with the amount of CP extension, the table illustrated in FIG. 13 may be preconfigured from base station 100 to terminal 200 in the same manner as in Example 1.

The indication of the "re-attempt" to terminal 200 in an M-bit field as described above allows a re-attempt at COT acquisition to be conditionally instructed, it is possible to improve the degree of freedom of scheduling in base station 100 in addition to the effect in Example 1.

Control methods 1 and 2 have been described, thus far.

Note that, control methods 1 and 2 may be applied in combination. For example, when terminal 200 fails COT acquisition in an FFP in which transmission is instructed by the "next FFP", the "re-attempt" makes it possible to instruct whether COT acquisition is re-attempted in the next FFP. Thus, it is possible to achieve a reduced delay time and an improved degree of freedom of scheduling.

Note that, the COT acquisition control method in Embodiment 1 (e.g., the method of controlling the priority of transmission by terminal 200 or base station 100 by configuring a plurality of transmission start timings at the beginning of an FFP) may be applied to the COT acquisition control methods in the present embodiment or any other control method may be applied thereto.

Embodiment 4

[Priority Configuration in Release 16 URLLC]

A function of defining or configuring the priority with respect to transmission by the terminal with "priority (high or low)" has been supported as an extension to the URLLC function in Release 16. This function may be used to determine transmission to be prioritized when a plurality of transmissions is triggered within the terminal. For example, the priority of a PUSCH may be configured dynamically or semi-statically by a UL grant.

In the present embodiment, for example, a method of controlling CP extension configuration based on the priority of transmission (or data, a channel or a service type) by the terminal will be described.

In exemplary configurations of the base station and the terminal according to the present embodiment, for example, some functions may be different from the functions in Embodiment 1 and the other functions may be the same as the functions in Embodiment 1.

In base station 100 (FIG. 6), for example, when CP extension configuration information (e.g., an amount of CP extension) for each terminal 200 is determined, scheduler 104 may configure a plurality of pieces of CP extension configuration information corresponding to a plurality of priorities, respectively. For example, scheduler 104 outputs the determined pieces of CP extension configuration information to control information holder 105. Further, for example, scheduler 104 may use these pieces of CP extension configuration information to transmit signaling information and to schedule PUSCH transmissions by terminal 200.

In terminal 200 (FIG. 7), for example, transmission controller 204 may refer to CP extension configuration information corresponding to the priority of a PUSCH to be transmitted based on the configured grant configuration information inputted from control information holder 205 or the decoding result inputted from demodulator/decoder 202 and may determine the amount of CP extension to be applied to the PUSCH. Transmission controller 204 outputs, for example, information on the determined amount of CP extension to CP adder 208.

[Operations of Base Station 100 and Terminal 200]

Exemplary operations in base station 100 and terminal 200 having the above configurations will be described.

In the present embodiment, for example, combinations each including a plurality of candidate amounts of CP extension (e.g., candidate CP lengths) that can be indicated by the CP extension configuration information may vary for respective priorities of transmission by terminal 200.

For example, base station 100 may cause the control information to include one of a plurality of candidate CP lengths included in one of the combinations varying for the respective priorities of transmission by terminal 200. Further, for example, terminal 200 may determine, based on the control information indicated by base station 100, one amount of CP extension from a plurality of candidate CP lengths included in at least one of the combinations that corresponds to a priority of transmission by terminal 200.

The priorities of transmission by terminal 200 may include, for example, "high" and "low". Note that, the types of priority of transmission by terminal 200 are not limited to two types, but may be equal to or greater than three types.

For example, exemplary COT acquisition control methods in cases where a PUSCH to be transmitted by terminal 200 is a "DG-PUSCH", a "type 1 CG PUSCH", and a "type 2 CG PUSCH" will be described. Terminal 200 may perform COT acquisition and PUSCH transmission based on the control information from base station 100, for example.

<Case of DG-PUSCH>

For example, a table for indicating a plurality of amounts of CP extension based on priorities may be configured. For example, the table for indicating amounts of CP extension based on priorities may be preconfigured from base station 100 to terminal 200 or may be defined by a standard.

Here, it is assumed for high-priority transmission, that an amount of CP extension is configured to be large in order to facilitate COT acquisition, for example. Accordingly, for example, a table corresponding to high priority may be configured to include a candidate with a larger amount of CP extension in comparison with a table corresponding to low priority.

For example, terminal 200 may determine a table to refer to at the time of PUSCH transmission based on a priority indicated by a UL grant. Further, for example, even in a case where there is no priority indication, terminal 200 may implicitly determine a table to refer to at the time of PUSCH transmission based on another parameter that allows a priority to be determined. As the other parameter that allows a priority to be determined, it is possible to mention, for example, a DCI format, or an identifier (e.g., a radio network temporary identifier (RNTI)) to be used by terminal 200.

For example, in a case where the types of priority are two types of high and low, two types of table for configuring the amount of CP extension may be configured. For example, terminal 200 may determine a table to refer to at the time of PUSCH transmission based on indication (e.g., priority) of a UL grant that instructs the PUSCH transmission.

FIG. 14 illustrates exemplary tables (e.g., an exemplary association between an index and an amount of CP extension) for configuring amounts of CP extension corresponding to low priority and high priority, respectively.

The table for high priority illustrated in FIG. 14 may include, for example, an amount of CP extension (e.g., "T-16 us", "T-25 us" or "T-34 us") larger than an amount of CP extension (e.g., "T-43 us", "T-52 us" or "T-61 us") in the table for low priority.

Note that, the amounts of CP extension included in the table for high priority and the table for low priority are not limited to the examples illustrated in FIG. 14, and some amounts of CP extension may be included in an overlapping manner in the table for high priority and the table for low priority. Further, although the tables illustrated in FIG. 14 include, for example, the channel access type and the CAPC in addition to the amount of CP extension, the present disclosure is not limited thereto. For example, the tables may not include at least one of the channel access type and the CAPC or may include any other parameter.

As described above, terminal 200 can transmit a PUSCH (e.g., acquire a COT) with an amount of CT extension in accordance with DG-PUSCH transmission by configuring or defining a plurality of tables corresponding to the priorities of transmission by terminal 200 to a DG-PUSCH and by switching the table, to which terminal 200 refers, in accordance with a priority.

Further, for example, since amounts of CT extension are configured in a plurality of tables corresponding to a plurality of priorities in comparison with a case where amounts of CP extension corresponding to a plurality of priorities are configured in one table, the number of candidate amounts of CP extension included in each table (in other words, the number of indexes) can be reduced, and signaling overhead of index indication can be reduced.

<Case of Type 1 CG-PUSCH>

In the type 1 CG, the priority of transmission by terminal 200 may be semi-statically configured, for example. Further, for example, the priorities of higher layer data included in data of the physical layer (e.g., priority for logical channel) may vary dynamically.

Accordingly, for example, a plurality of tables corresponding to the priority for logical channel may be configured with respect to the amount of CP extension. For example, terminal 200 may determine a table to refer to, based on one of the priorities of higher layer data included in data of the physical layer. For example, terminal 200 may dynamically switch CP extension by determining a table to refer to, based on the logical channel having the highest priority. Note that, the determination of the table reference is not limited to that based on the highest priority, but may be based on any other priority.

As described above, switching CP extension in accordance with the priority for logical channel for the type 1 CG-PUSCH makes it possible to support dynamic priority control even in the type 1 CG that is operated by semi-static configuration, and makes it possible to reduce a delay time of data to be transmitted in a more prioritized manner.

<Case of Type 2 CG-PUSCH>

In the type 2 CG, for example, the priority may be configured for each activation by using a priority field included in a PDCCH for activation.

Accordingly, for example, a plurality of tables corresponding to a plurality of priorities may be configured with respect to the amount of CP extension in the same manner as with the DG-PUSCH.

For example, terminal 200 may determine, based on a priority and an index in a table that are indicated by a PDCCH for activation, a table to refer to at the time of CG-PUSCH transmission and an amount of CP extension corresponding to the index to be indicated in the table.

As described above, terminal 200 can flexibly (for each activation or reactivation) configure an amount of CP extension by determining an amount of CP extension for the type 2 CG-PUSCH based on a priority and an index, which are indicated by a PDCCH for activation, in comparison with a case where CP extension is semi-statically determined.

Further, for example, since amounts of CT extension are configured in a plurality of tables corresponding to a plurality of priorities in comparison with a case where amounts of CP extension corresponding to a plurality of priorities are configured in one table, the number of candidate amounts of CP extension included in each table (in other words, the number of indexes) can be reduced, and signaling overhead of index indication can be reduced.

Exemplary COT acquisition control methods have been described, thus far.

As described above, in the present embodiment, combinations (e.g., tables) each including a plurality of candidate amounts of CP extension with respect to an amount of CP extension indicated by the CP extension configuration information may vary for respective priorities of transmission by terminal 200. For example, base station 100 can reduce a delay in PUSCH transmission by terminal 200 by configuring the CP extension for a plurality of transmission timings based on the priorities of PUSCH transmissions for both the DG-PUSCH and the CG-PUSCH.

Note that, for example, the priorities of transmissions by terminal 200 have been described in the present embodiment, but the present disclosure is not limited thereto. The priorities may be, for example, priorities among a plurality of terminals 200 (or between terminal(s) 200 and base station 100).

Further, the COT acquisition control method in Embodiment 1 (e.g., the method of controlling the priority of transmission by terminal 200 or base station 100 by configuring a plurality of transmission start timings at the beginning of an FFP) may be applied to the COT acquisition control methods in the present embodiment or any other control method may be applied thereto.

Embodiments of the present disclosure have been described, thus far.

Other Embodiments

The embodiments described above may be applied in combination.

In the embodiments described above, the uplink signal is not limited to an uplink data channel, such as a PUSCH, a DG-PUSCH or a CG-PUSCH, but may be any other signal or channel. For example, application to a physical uplink control channel (PUCCH) or a sounding reference signal (SRS) may be performed. For example, since transmission of the PUCCH or SRS may be instructed not by a UL grant, but by DL assignment (e.g., scheduling information of dynamical downlink data), the UL grant in the embodiments described above may be replaced with the DL assignment and be applied.

(Control Signals)

In an exemplary embodiment of the present disclosure, the downlink control signal (or downlink control information) may be, for example, a signal (or information) transmitted through a physical downlink control channel (PDCCH) of the physical layer or may be a signal (or information) transmitted in the medium access control (MAC) of the higher layer or the radio resource control (RRC). Further, the signal (or information) is not necessarily indicated by the downlink control signal, but may be predefined in a specification (or standard) or may be preconfigured for the base station and the terminal.

In an exemplary embodiment of the present disclosure, the uplink control signal (or uplink control information) may be, for example, a signal (or information) transmitted through a PDCCH of the physical layer or may be a signal (or information) transmitted in the MAC of the higher layer or the RRC. Further, the signal (or information) is not necessarily indicated by the uplink control signal, but may be predefined in a specification (or standard) or may be preconfigured for the base station and the terminal. Further, the uplink control signal may be replaced with, for example, uplink control information (UCI), the 1st stage sidelink control information (SCI) or the 2nd stage SCI.

(Base Station)

In an exemplary embodiment of the present disclosure, the base station may be a transmission reception point (TRP), a clusterhead, an access point, a remote radio head (RRH), an eNodeB (eNB), a gNodeB (gNB), a base station (BS), a base transceiver station (BTS), a base unit or a gateway, for example. Further, in the sidelink communication, a terminal may be adopted instead of a base station. Further, the base station may be replaced with a relay apparatus that relays communication between a higher node and a terminal.

(Uplink/Downlink/Sidelink)

An exemplary embodiment of the present disclosure may be applied to, for example, any of uplink, downlink, and sidelink. An exemplary embodiment of the present disclosure may be applied to, for example, uplink channels, such as physical uplink shared channel (PUSCH), physical uplink control channel (PUCCH), and physical random access channel (PRACH), downlink channels, such as physical downlink shared channel (PDSCH), PDCCH, and physical broadcast channel (PBCH), or sidelink channels, such as physical sidelink shared channel (PSSCH), physical sidelink control channel (PSCCH), and physical sidelink broadcast channel (PSBCH).

Note that, PDCCH, PDSCH, PUSCH, and PUCCH are examples of a downlink control channel, a downlink data channel, an uplink data channel, and an uplink control channel, respectively. Further, PSCCH and PSSCH are examples of a side link control channel and a sidelink data channel, respectively. Further, PBCH and PSBCH are examples of broadcast channels, and PRACH is an example of a random access channel.

(Data Channel/Control Channel)

An exemplary embodiment of the present disclosure may be applied to, for example, any of the data channels and control channels. For example, the channel in an exemplary embodiment of the present disclosure may be replaced with one of data channels including PDSCH, PUSCH and PSSCH or control channels including PDCCH, PUCCH, PBCH, PSCCH, and PSBCH.

(Reference Signals)

In an exemplary embodiment of the present disclosure, the reference signals are, for example, signals known to both a base station and a mobile station and each reference signal may be referred to as a reference signal (RS) or sometimes a pilot signal. The reference signal may be any of a demodulation reference signal (DMRS), a channel state information-reference signal (CSI-RS), a tracking reference signal (TRS), a phase tracking reference signal (PTRS), a cell-specific reference signal (CRS), or a sounding reference signal (SRS).

(Time Intervals)

In an exemplary embodiment of the present disclosure, time resource units are not limited to one or a combination of slots and symbols, and may be time resource units, such as frames, superframes, subframes, slots, time slots, subslots, minislots, or time resource units, such as symbols, orthogonal frequency division multiplexing (OFDM) symbols, single carrier-frequency division multiplexing (SC-FDMA) symbols, or other time resource units. The number of symbols included in one slot is not limited to any number of symbols exemplified in the embodiments described above, and may be other numbers of symbols.

(Frequency Bands)

An exemplary embodiment of the present disclosure may be applied to any of a licensed band and an unlicensed band.

(Communication)

An exemplary embodiment of the present disclosure may be applied to any of communication between a base station and a terminal, communication between a terminal and a terminal (sidelink communication, Uu-link communication), and vehicle to everything (V2X) communication. The channels in an exemplary embodiment of the present disclosure may be replaced with any on PSCCH, PSSCH, physical sidelink feedback channel (PSFCH), PSBCH, PDCCH, PUCCH, PDSCH, PUSCH, or PBCH.

In addition, an exemplary embodiment of the present disclosure may be applied to any of a terrestrial network or a network other than a terrestrial network (NTN: non-terrestrial network) using a satellite or a high altitude pseudo satellite (HAPS). In addition, an exemplary embodiment of the present disclosure may be applied to a network having a large cell size, and a terrestrial network with a large delay compared with a symbol length or a slot length, such as an ultra-wideband transmission network.

(Antenna Ports)

In an exemplary embodiment of the present disclosure, an antenna port refers to a logical antenna (antenna group) formed of one or more physical antenna(s). For example, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal station is allowed to transmit a reference signal. The antenna port may also be defined as the minimum unit for multiplication of a precoding vector weighting.

<5G NR System Architecture and Protocol Stacks>

3GPP has been working at the next release for the 5th generation cellular technology, simply called 5G, including the development of a new radio (NR) access technology operating in frequencies ranging up to 100 GHz. The first version of 50 standard was initially delivered in late 2017, which allows proceeding to trials and commercial deployments of 5G NR standard-compliant terminals, e.g., smartphones.

Figure 15:
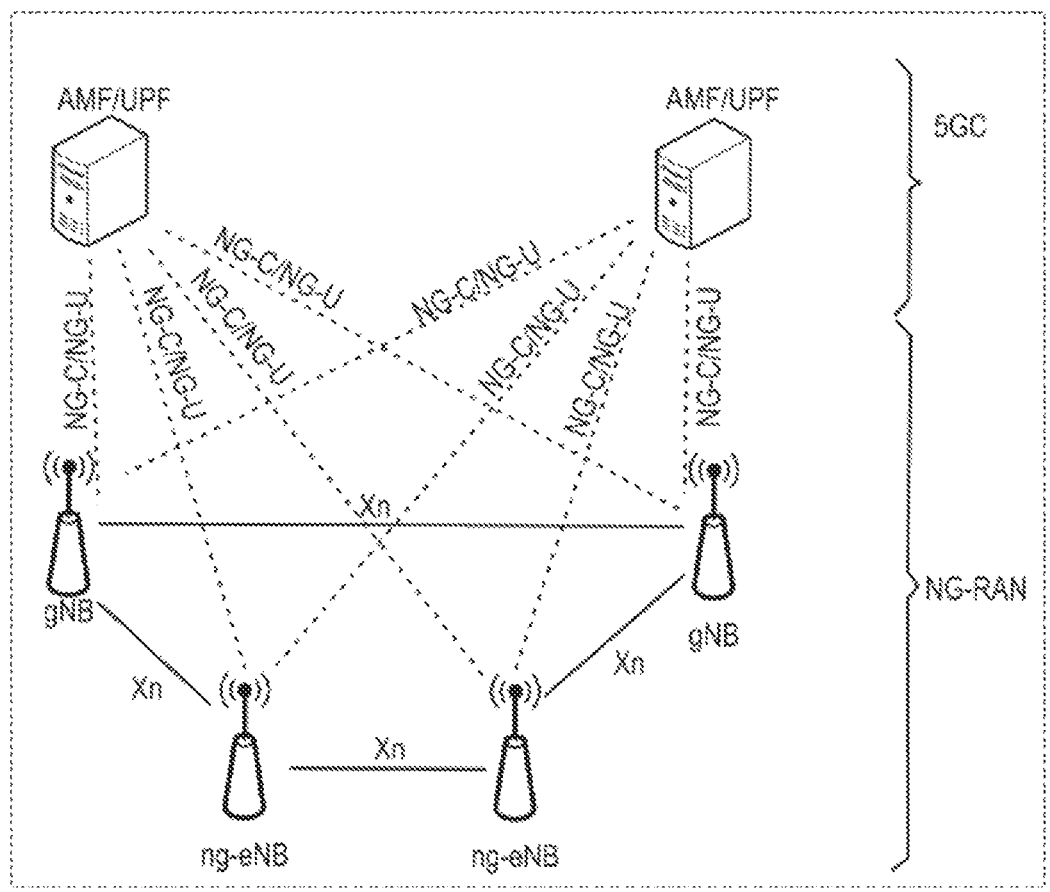
FIG. 15 illustrates an exemplary architecture for a 3GPP NR system.

For example, the overall system architecture assumes a Next Generation-Radio Access Network (NG-RAN) that includes gNBs. The gNBs provide the NG-radio access user plane (SDAP/PDCP/RLC/MAC/PHY) and control plane (RRC) protocol terminations towards a UE. The gNBs are interconnected with each other via an Xn interface. The gNBs are also connected to the Next Generation Core (NGC) via the Next Generation (NO) interface, more specifically to the Access and Mobility Management Function (AMF; e.g. a particular core entity performing the AMF) via the NG-C interface, and to the User Plane Function (UPF; e.g. a particular core entity performing the UPF) via the NG-U interface. The NG-RAN architecture is illustrated in FIG. 15 (see, for example, 3GPP TS 38.300 v15.6.0, section 4).

The user plane protocol stack for NR (see, for example, 3GPP TS 38.300, section 4.4.1) includes the Packet Data Convergence Protocol (PDCP, see clause 6.4 of TS 38.300) Radio Link Control (RLC, see clause 6.3 of TS 38.300) and Medium Access Control (MAC, see clause 6.2 of TS 38.300) sublayers, which are terminated in the gNB on the network side. Additionally, a new access stratum (AS) sublayer (Service Data Adaptation Protocol: SDAP) is introduced above the PDCP (see, for example, clause 6.5 of 3GPP TS 38.300). A control plane protocol stack is also defined for NR (see, for example, TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For example, the Medium-Access-Control layer handles logical-channel multiplexing, and scheduling and scheduling-related functions, including handling of different numerologies.

The physical layer (PHY) is, for example, responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For example, the physical channels include a Physical Random Access Channel (PRACH), Physical Uplink Shared Channel (PUSCH), and Physical Uplink Control Channel (PUCCH) as uplink physical channels, and a Physical Downlink Shared Channel (PDSCH), Physical Downlink Control Channel (PDCCH), and Physical Broadcast Channel (PBCH) as downlink physical channels.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, the eMBB is expected to support peak data rates (20 Gbps for downlink and 10 Gbps for uplink) and user-experienced data rates in the order of three times what is offered by IMT-Advanced. Meanwhile, in a case of the URLLC, the tighter requirements are put on ultra-low latency (0.5 ms for each of UL and DL for user plane latency) and high reliability (1-10-5 within 1 ms). Finally, the mMTC may preferably require high connection density (1,000,000 devices/km2 in an urban environment), large coverage in harsh environments, and extremely long-life battery for low cost devices (15 years).

Thus, the OFDM numerology (e.g., subcarrier spacing, OFDM symbol duration, cyclic prefix (CP) duration, the number of symbols per scheduling interval) that is suitable for one use case might not work well for another. For example, low-latency services may preferably require a shorter symbol duration (and thus larger subcarrier spacing) and/or fewer symbols per scheduling interval (also referred to as TTI) than an mMTC service. Furthermore, deployment scenarios with large channel delay spreads may preferably require a longer CP duration than scenarios with short delay spreads. The subcarrier spacing may be optimized accordingly to retain the similar CP overhead. NR may support more than one value of subcarrier spacing. Correspondingly, subcarrier spacing of 15 kHz, 30 kHz, 60 kHz . . . are currently considered. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR, for each numerology and carrier, a resource grid of subcarriers and OFDM symbols is defined for each of uplink and downlink. Each element in the resource grid is called a resource element and is identified based on the frequency index in the frequency domain and the symbol position in the time domain (see 3GPP TS 38.211 v15.6.0).

<50 NR Functional Split between NG-RAN and 5GC>

Figure 16:
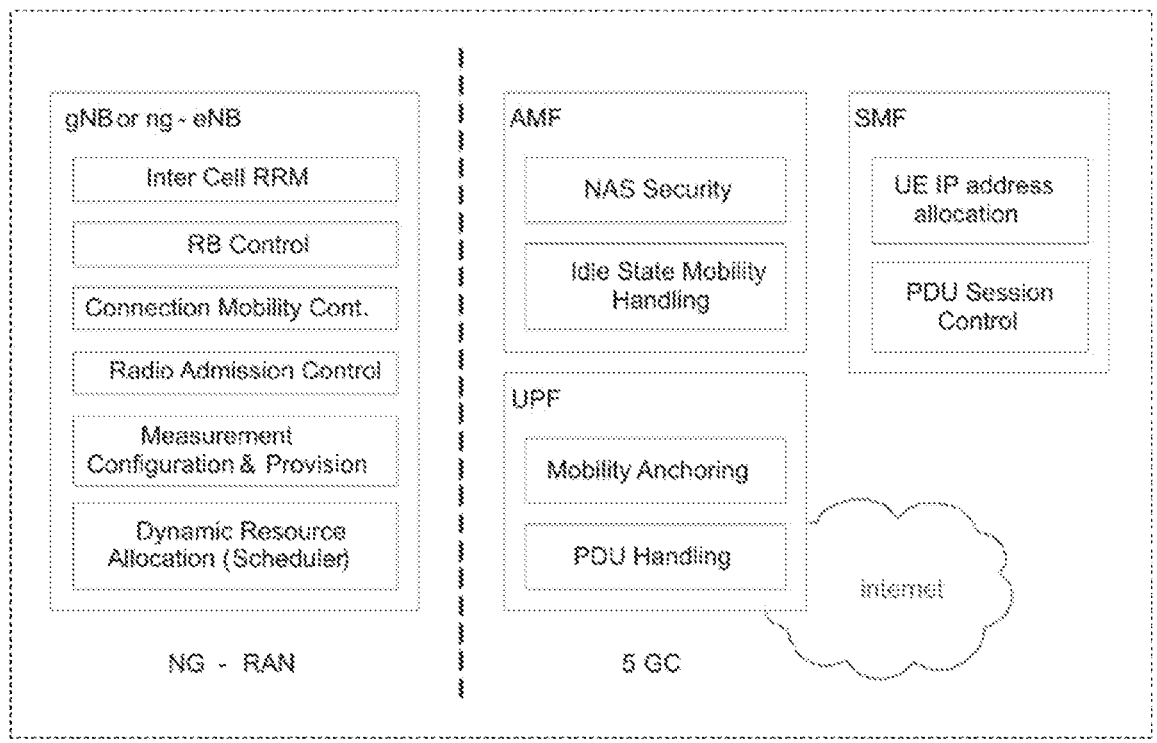
FIG. 16 is a schematic diagram illustrating functional split between a next generation-radio access network (NG-RAN) and 5th generation core (5GC)

FIG. 16 illustrates functional split between NG-RAN and 5GC. An NG-RAN logical node is a gNB or ng-eNB. The 5GC has logical nodes AMF, UPF, and SMF.

For example, the gNB and ng-eNB host the following main functions:
  Functions for radio resource management such as radio bearer control, radio admission control, connection mobility control, dynamic allocation of resources to UEs in both uplink and downlink (scheduling);
  IP header compression, encryption, and integrity protection of data;
  Selection of an AMF at UE attachment when no routing to an AMF can be determined from the information provided by the UE;
  Routing of user plane data towards UPF(s);
  Routing of control plane information towards AMF;
  Connection setup and release;
  Scheduling and transmission of paging messages;
  Scheduling and transmission of system broadcast information (originated from the AMF or Operation, Admission, Maintenance (OAM));
  Measurement and measurement reporting configuration for mobility and scheduling;
  Transport level packet marking in the uplink;
  Session management;
  Support of network slicing;
  QoS Flow management and mapping to data radio bearers;
  Support of UEs in RRC_INACTIVE state;
  Distribution function for NAS messages;
  Radio access network sharing;
  Dual Connectivity; and
  Tight interworking between NR and E-UTRA.

The access and mobility management function (AMF) hosts the following main functions:
  Non-Access Stratum (NAS) signaling termination function;
  NAS signaling security;
  Access Stratum (AS) security control;
  Inter Core Network (CN) node signaling for mobility between 3GPP access networks;
  Idle mode UE reachability (including control and execution of paging retransmission);
  Registration area management;
  Support of intra-system and inter-system mobility;
  Access authentication;
  Access authorization including check of roaming rights;
  Mobility management control (subscription and policies);
  Support of network slicing; and
  Session Management Function (SMF) selection.

Furthermore, the user plane function (UPF) hosts the following main functions:
  Anchor point for intra-/inter-RAT mobility (when applicable);
  External protocol data unit (PDU) session point of interconnect to a data network;
  Packet routing and forwarding;
  Packet inspection and user plane part of policy rule enforcement;
  Traffic usage reporting;
  Uplink classifier to support routing traffic flows to a data network;
  Branching point to support multi-homed PDU session;
  QoS handling for user plane (e.g. packet filtering, gating, and UL/DL rate enforcement);
  Uplink traffic verification (SDF to QoS flow mapping); and
  Downlink packet buffering and downlink data indication triggering.

Finally, the session management function (SMF) hosts the following main functions:
  Session management;
  UE IP address allocation and management;
  Selection and control of UPF;
  Configuration function of traffic steering at a user plane function (UPF) to route traffic to proper destination;
  Control part of policy enforcement and QoS; and
  Downlink data indication.

<RRC Connection Setup and Reconfiguration Procedures>

Figure 17:
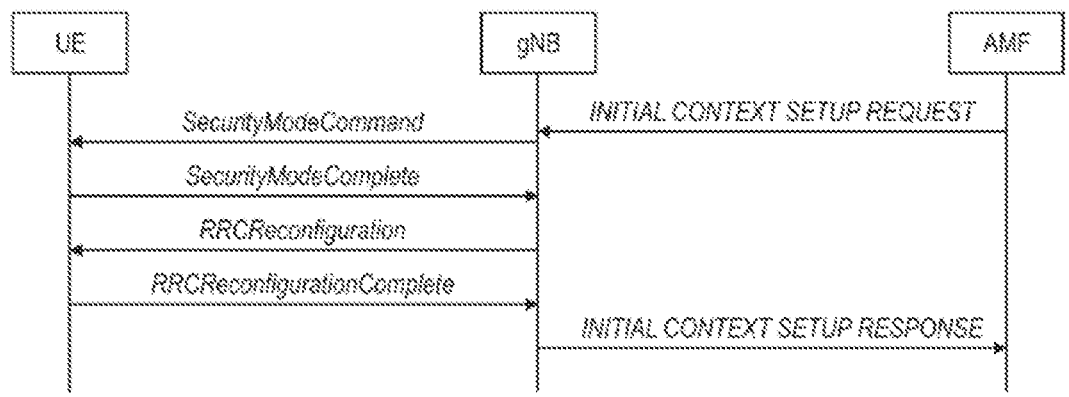
FIG. 17 is a sequence diagram for radio resource control (RRC) connection setup/reconfiguration procedures.

FIG. 17 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. This transition involves that the AMF prepares the UE context data (including, for example, PDU session context, security key, UE radio capability, and UE security capabilities, etc.) and transmits the UE context data to the gNB with an INITIAL CONTEXT SETUP REQUEST. Then, the gNB activates the AS security with the UE, which is performed by the gNB transmitting a SecurityModeCommand message to the UE and by the UE responding to the gNB with a SecurityModeComplete message. Afterwards, the gNB performs the reconfiguration to set up the Signaling Radio Bearer 2 (SRB2) and Data Radio Bearer(s) (DRB(s)) by transmitting an RRCReconfiguration message to the UE and, in response, receiving an RRCReconfigurationComplete from the UE. For a signaling-only connection, the steps relating to the RRCReconfiguration are skipped since the SRB2 and DRBs are not setup. Finally, the gNB indicates to the AMF that the setup procedure is completed with an INITIAL CONTEXT SETUP RESPONSE.

In the present disclosure, thus, an entity (e.g., AMF, SMF, etc.) of the 5th Generation Core (5GC) is provided that includes control circuitry, which, in operation, establishes a Next Generation (NG) connection with a gNodeB, and a transmitter, which in operation, transmits an initial context setup message, via the NG connection, to the gNodeB to cause a signaling radio bearer setup between the gNodeB and user equipment (UE). In particular, the gNodeB transmits a radio resource control (RRC) signaling containing a resource allocation configuration information element (IE) to the UE via the signaling radio bearer. The UE then performs an uplink transmission or a downlink reception based on the resource allocation configuration.

<Usage Scenarios of IMT for 2020 and Beyond>

Figure 18:
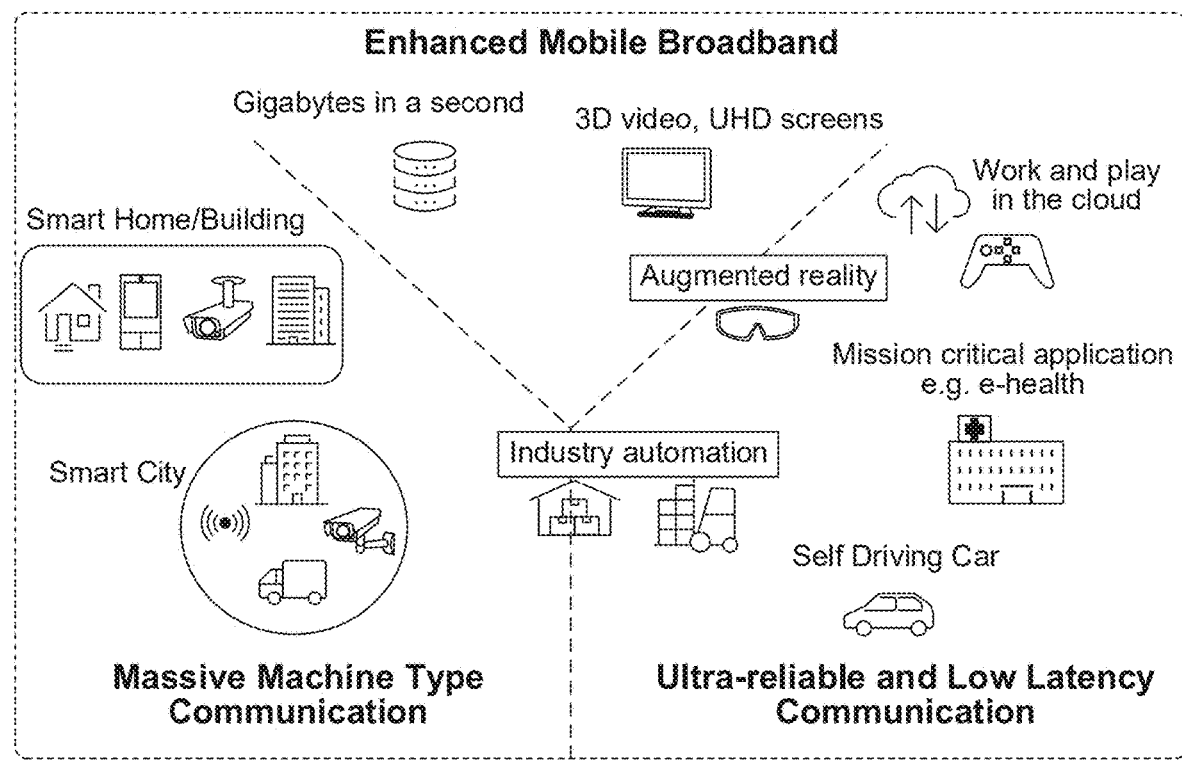
FIG. 18 is a schematic diagram illustrating usage scenarios of enhanced mobile broadband (eMBB), massive machine type communications (mMTC), and ultra reliable and low latency communications (URLLC)

FIG. 18 illustrates some of the use cases for 5G NR. In the 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 18 illustrates some examples of envisioned usage scenarios for IMT for 2020 and beyond (see, for example, ITU-R M. 2083 FIG. 2).

The URLLC use case has stringent requirements for capabilities such as throughput, latency, and availability. The URLLC use case has been envisioned as one of element techniques to enable future vertical applications such as wireless control of industrial manufacturing or production processes, remote medical surgery, distribution automation in a smart grid, transportation safety, etc. Ultra-reliability for the URLLC is to be supported by identifying the techniques to meet the requirements set by TR 38.913. For NR URLLC in Release 15, key requirements include a target user plane latency of 0.5 ms for uplink (UL) and 0.5 ms for downlink (DL). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for the URLLC, more compact DCI formats, repetition of PDCCH, etc. However, the scope may widen for achieving ultra-reliability as the NR becomes more stable and developed (for NR URLLC key requirements). Particular use cases of NR URLLC in Release 15 include augmented reality/virtual reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. The pre-emption means that a transmission for which resources have already been allocated is stopped, and the already allocated resources are used for another transmission that has been requested later but has lower latency/higher priority requirements. Accordingly, the already granted transmission is replaced with a later transmission. The pre-emption is applicable independent of the particular service type. For example, a transmission for a service-type A (URLLC) may be replaced with a transmission for a service type B (such as eMBB). Technology enhancements with respect to reliability improvement include dedicated CQI/MCS tables for the target BLER of 1E-5.

The use case of the mMTC (massive machine type communication) is characterized by a very large number of connected devices typically transmitting a relatively low volume of non-delay sensitive data. Devices are required to be low cost and to have a very long battery life. From the NR perspective, utilizing very narrow bandwidth parts is one possible solution to have power saving from the UE perspective and enable the long battery life.

As mentioned above, it is expected that the scope of reliability improvement in NR becomes wider. One key requirement to all the cases, and especially necessary for the URLLC and mMTC for example, is high reliability or ultra-reliability. Several mechanisms can be considered to improve the reliability from the radio perspective and network perspective. In general, there are a few key important areas that can help improve the reliability. These areas include compact control channel information, data/control channel repetition, and diversity with respect to the frequency, time, and/or spatial domain. These areas are applicable to reliability improvement in general, regardless of particular communication scenarios.

For NR URLLC, further use cases with tighter requirements have been considered such as factory automation, transport industry, and electrical power distribution. The tighter requirements are higher reliability (up to 10-6 level), higher availability, packet size of up to 256 bytes, time synchronization down to the order of a few μs where the value can be one or a few μs depending on frequency range and short latency in the order of 0.5 to 1 ms (e.g., target user plane latency of 0.5 ms) depending on the use cases.

Moreover, for NR URLLC, several technology enhancements from the physical layer perspective have been identified. These technology enhancements include Physical Downlink Control Channel (PDCCH) enhancements related to compact DCI, PDCCH repetition, and increased PDCCH monitoring. In addition, Uplink Control Information (UCI) enhancements are related to enhanced Hybrid Automatic Repeat Request (HARQ) and CSI feedback enhancements. Also, PUSCH enhancements related to mini-slot level hopping and retransmission/repetition enhancements have been identified. The term "mini-slot" refers to a transmission time interval (TTI) including a smaller number of symbols than a slot (a slot includes fourteen symbols).

<QoS Control>

The 5G Quality of Service (QoS) model is based on QoS flows and supports both QoS flows that require guaranteed flow bit rate (GBR QoS flows) and QoS flows that do not require guaranteed flow bit rate (non-GBR QoS Flows). At the NAS level, the QoS flow is thus the finest granularity of QoS differentiation in a PDU session. A QoS flow is identified within a PDU session by a QoS flow ID (QFI) carried in an encapsulation header over the NG-U interface.

For each UE, the 5GC establishes one or more PDU sessions. For each UE, the NG-RAN establishes at least one Data Radio Bearer (DRB) together with the PDU session, for example as illustrated above with reference to FIG. 17. Additional DRB(s) for QoS flow(s) of that PDU session can be subsequently configured (it is up to NG-RAN when to do so). The NG-RAN maps packets belonging to different PDU sessions to different DRBs. NAS level packet filters in the UE and 5GC associate UL and DL packets with QoS flows, whereas AS-level mapping rules in the UE and in the NG-RAN associate UL and DL QoS flows with DRBs.

Figure 19:
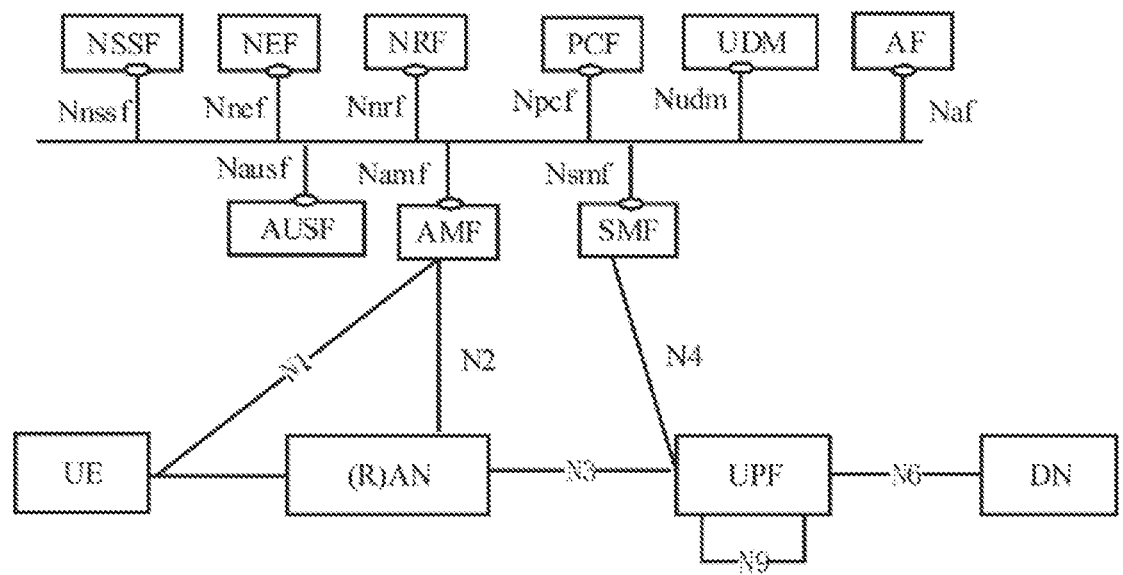
FIG. 19 is a block diagram illustrating an exemplary 5G system architecture for a non-roaming scenario.

FIG. 19 illustrates a 5G NR non-roaming reference architecture (see TS 23.501 v16.1.0, section 4.23). An Application Function (AF), e.g. an external application server hosting 5G services exemplified in FIG. 18, interacts with the 3GPP core network in order to provide services, for example, to support application influence on traffic routing, accessing a Network Exposure Function (NEF) or interacting with the policy framework for policy control (see Policy Control Function, PCF), e.g. QoS control. Based on operator deployment, application functions considered to be trusted by the operator can be allowed to interact directly with relevant network functions. Application functions not allowed by the operator to access directly the network functions use the external exposure framework via the NEF to interact with relevant network functions.

FIG. 19 illustrates further functional units of the 5G architecture, namely a Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access, or 3rd party services. All of or a part of the core network functions and the application services may be deployed and running on cloud computing environments.

In the present disclosure, thus, an application server (for example, AF of the 5G architecture), is provided that includes a transmitter, which in operation, transmits a request containing a QoS requirement for at least one of the URLLC, eMMB, and mMTC services to at least one of functions (for example NEF, AMF, SMF, PCF, UPF, etc) of the 5GC to establish a PDU session including a radio bearer between a gNodeB and a UE in accordance with the QoS requirement, and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a tele-health/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an exemplary embodiment of the present disclosure includes: control circuitry, which, in operation, determines a cyclic prefix (CP) length coordinated between the terminal and a base station; and transmission circuitry, which, in operation, transmits control information on the CP length to the terminal, where the CP length has been determined.

In an exemplary embodiment of the present disclosure, the control circuitry causes the control information to include one of a plurality of candidate CP lengths included in one of combinations each including the plurality of candidate CP lengths, where the combinations vary for respective types of channel occupancy time.

In an exemplary embodiment of the present disclosure, at least one of the plurality of candidate CP lengths included in at least one of the combinations that corresponds to a first type is based on timing alignment (TA), and the plurality of candidate CP lengths included in at least one of the combinations that corresponds to a second type is not based on the TA.

In an exemplary embodiment of the present disclosure, at least one of the plurality of candidate CP lengths included in at least one of the combinations that corresponds to a first type is based on a category of carrier sensing, and the plurality of candidate CP lengths included in at least one of the combinations that corresponds to a second type is not based on the category.

In an exemplary embodiment of the present disclosure, the transmission circuitry transmits other information on time domain scheduling, where the other information differs from the CP length.

In an exemplary embodiment of the present disclosure, the other information includes information indicating a start timing of the scheduling with respect to the terminal.

In an exemplary embodiment of the present disclosure, the other information includes information indicating a candidate timing of channel occupancy time for the terminal.

In an exemplary embodiment of the present disclosure, the control circuitry causes the control information to include one of a plurality of candidate CP lengths included in one of combinations each including the plurality of candidate CP lengths, where the combinations vary for respective priorities with respect to the terminal or a channel.

A terminal according to an exemplary embodiment of the present disclosure includes: reception circuitry, which, in operation, receives control information on a cyclic prefix (CP) length coordinated between the terminal and a base station; and control circuitry, which, in operation, controls uplink transmission based on the CP length.

A communication method according to an exemplary embodiment of the present disclosure includes: determining, by a base station, a cyclic prefix (CP) length coordinated between a terminal and the base station; and transmitting, by the base station, control information on the CP length to the terminal, where the CP length has been determined.

A communication method according to an exemplary embodiment of the present disclosure includes: receiving, by a terminal, control information on a cyclic prefix (CP) length coordinated between the terminal and a base station; and controlling, by the terminal, uplink transmission based on the CP length.

The disclosure of Japanese Patent Application No. 2020-134799, filed on Aug. 7, 2020, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST

100 Base station
101, 201 Receiver
102, 202 Demodulator/decoder
103, 203 Carrier sensor
104 Scheduler
105, 205 Control information holder
106, 206 Data/control information generator
107, 207 Encoder/modulator
108, 208 CP adder
109, 209 Transmitter
200 Terminal
204 Transmission controller

The invention claimed is:

1. A terminal, comprising:
reception circuitry, which, in operation, receives control information on a cyclic prefix (CP) length; and
control circuitry, which, in operation, controls sidelink transmission based on the CP length,
wherein the CP length is different between a first case where information indicating a channel occupancy time is a first value and a second case where information indicating a channel occupancy time is a second value.

2. The terminal according to claim 1, wherein the control information includes different information on CP lengths for different types of channel occupancy time.

3. The terminal according to claim 2, wherein:
a CP length that corresponds to a first type is based on timing alignment (TA), and
a CP length that corresponds to a second type is not based on the TA.

4. The terminal according to claim 2, wherein:
a CP length that corresponds to a first type is based on a category of carrier sensing, and
a CP length that corresponds to a second type is not based on the category.

5. The terminal according to claim 1, wherein the reception circuitry receives information on an index that is related to a table used to configure the CP length.

6. The terminal according to claim 1, wherein the reception circuitry receives information indicating a start timing of scheduling with respect to the terminal.

7. The terminal according to claim 1, wherein the reception circuitry receives information indicating a candidate timing of channel occupancy time for the terminal.

8. The terminal according to claim 1, wherein the control information includes different information on CP lengths for different priorities with respect to the sidelink transmission.

9. The terminal according to claim 1, wherein the control information is indicated by Radio Resource Control (RRC).

10. The terminal according to claim 1, wherein the control information is indicated for each terminal.

11. The terminal according to claim 1, wherein the CP length is different between a first case where a channel occupancy time is a first length and a second case where the channel occupancy time is a second length.

12. The terminal according to claim 1, wherein the CP length is different based on a subcarrier spacing.

13. The terminal according to claim 1, wherein a same CP length is configurable in a first case where a channel occupancy time is a first length and in a second case where a channel occupancy time is a second length.

14. A communication method, comprising:
receiving, by a terminal, control information on a cyclic prefix (CP) length; and
controlling, by the terminal, sidelink transmission based on the CP length,
wherein the CP length is different between a first case where information indicating a channel occupancy time is a first value and a second case where information indicating a channel occupancy time is a second value.

15. An integrated circuit, comprising:
reception circuitry, which, in operation, receives control information on a cyclic prefix (CP) length; and
control circuitry, which, in operation, controls sidelink transmission based on the CP length,
wherein the CP length is different between a first case where information indicating a channel occupancy time is a first value and a second case where information indicating a channel occupancy time is a second value.

* * * * *